United States Patent
Kimoto

(10) Patent No.: US 9,654,680 B2
(45) Date of Patent: May 16, 2017

(54) IMAGE CAPTURING APPARATUS AND CONTROL METHOD THEREFOR

(71) Applicant: CANON KABUSHIKI KAISHA, Tokyo (JP)

(72) Inventor: Satoshi Kimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/516,265

(22) Filed: Oct. 16, 2014

(65) Prior Publication Data
US 2015/0109479 A1   Apr. 23, 2015

(30) Foreign Application Priority Data

Oct. 17, 2013  (JP) ................................. 2013-216752
Oct. 17, 2013  (JP) ................................. 2013-216753

(51) Int. Cl.
*H04N 5/232*     (2006.01)
*H04N 5/378*     (2011.01)

(52) U.S. Cl.
CPC ..... *H04N 5/23212* (2013.01); *H04N 5/23219* (2013.01); *H04N 5/23248* (2013.01); *H04N 5/23254* (2013.01); *H04N 5/23293* (2013.01); *H04N 5/378* (2013.01)

(58) Field of Classification Search
CPC ........... H04N 5/23212; H04N 5/23219; H04N 5/23254; H04N 5/23248; H04N 5/23293; H04N 5/378; G03B 13/36
USPC ........................................................ 348/349
See application file for complete search history.

(56) References Cited

U.S. PATENT DOCUMENTS

| | | | | |
|---|---|---|---|---|
| 8,111,321 B2* | 2/2012 | Yoshida | ................. | H04N 5/232 348/231.2 |
| 2006/0077835 A1* | 4/2006 | Minemura | ........... | G11B 7/1267 369/47.53 |
| 2006/0104523 A1* | 5/2006 | Suzuki | ............... | H04N 5/23216 382/232 |
| 2011/0043654 A1* | 2/2011 | Fujita | ..................... | H04N 5/232 348/222.1 |
| 2011/0176794 A1* | 7/2011 | Ichimiya | .................. | G02B 7/28 396/123 |
| 2012/0099010 A1* | 4/2012 | Sugiyama | ......... | H01L 27/14609 348/294 |

(Continued)

FOREIGN PATENT DOCUMENTS

| | | |
|---|---|---|
| JP | 4558830 B2 | 10/2010 |
| JP | 4797522 B2 | 10/2011 |
| WO | 2008/023706 A1 | 2/2008 |

*Primary Examiner* — Gevell Selby
(74) *Attorney, Agent, or Firm* — Cowan, Liebowitz & Latman, P.C.

(57) ABSTRACT

An image capturing apparatus comprising: an image sensor controlled at different readout intervals in a plurality of different regions; a selection unit configured to select one of a first image signal read out from a first region and a second image signal read out from a second region that is controlled at a readout interval shorter than those of the first region; a detection unit configured to detect a focus state level based on an image signal read out from the image sensor; and a focus control unit configured to, based on the focus state level detected by the detection unit based on the image signal selected by the selection unit, control a focus lens. The first image signal is used for at least one of display in a display unit and storage in a storage medium.

23 Claims, 21 Drawing Sheets

(56) References Cited

U.S. PATENT DOCUMENTS

2013/0057754 A1* 3/2013 Shimada ............ H04N 5/35581
  348/362
2014/0085512 A1* 3/2014 Ikeda ..................... H04N 5/343
  348/240.2

* cited by examiner

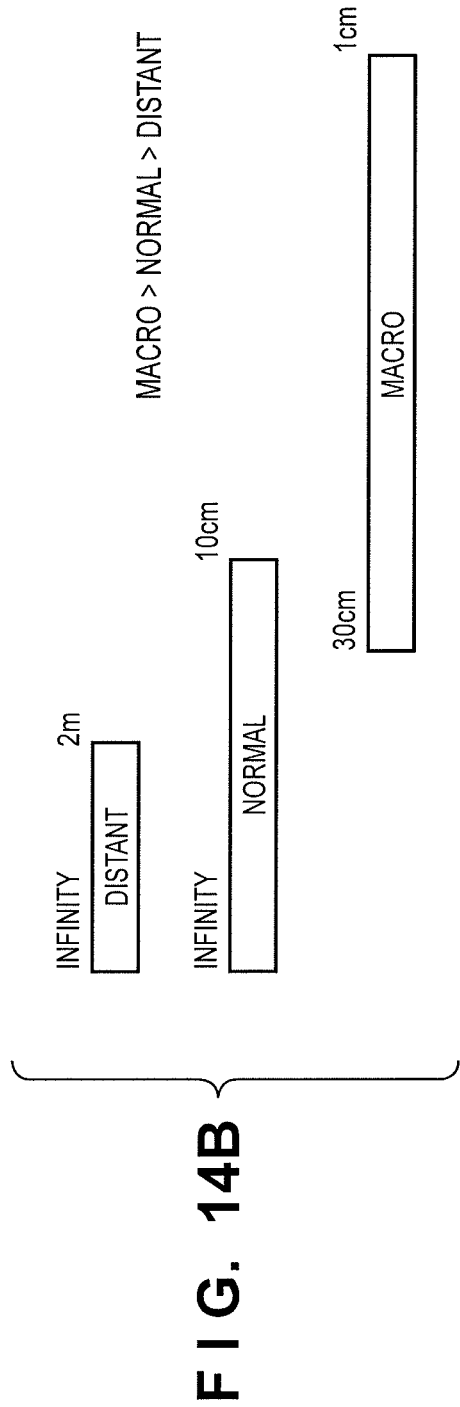
| DISTANCE MEASUREMENT RANGE SETTING | FOCUS STATE LEVEL | | | |
|---|---|---|---|---|
| | LESS THAN OR EQUAL TO γ | GREATER THAN γ, LESS THAN OR EQUAL TO β | GREATER THAN β, LESS THAN OR EQUAL TO α | GREATER THAN α |
| MACRO | B | B | B | A |
| NORMAL | B | B | A | A |
| DISTANT | B | A | A | A |
F I G. 14A
F I G. 14B
MACRO > NORMAL > DISTANT

| CURRENT OBJECT | FOCUS STATE LEVEL | | | |
|---|---|---|---|---|
| | LESS THAN OR EQUAL TO γ | GREATER THAN γ, LESS THAN OR EQUAL TO β | GREATER THAN β, LESS THAN OR EQUAL TO α | GREATER THAN α |
| DEFAULT | B | B | A | A |
| FACE | B | B | B | A |
| USER-SELECTED | B | B | B | A |

IMAGE CAPTURING APPARATUS AND CONTROL METHOD THEREFOR

BACKGROUND OF THE INVENTION

Field of the Invention

The present invention relates to image capturing apparatuses and control methods therefor, and particularly relates to image capturing apparatuses that perform focus adjustment based on an image signal obtained from an image sensor, and to control methods therefor.

Description of the Related Art

Most digital cameras now have display units such as LCDs or the like, and it has become typical to shoot an image while observing an object displayed in the display unit; as such, these display units are used when preparing to shoot still images and when shooting moving pictures. Furthermore, digital cameras that carry out focusing operations continuously during display are under development, and it is necessary to display an image of an object in the display unit inconspicuously even when such focusing operations are being carried out. Compact digital cameras in particular often use a contrast detection-based focus adjustment system, but doing so poses the following problems.

In a contrast detection-based system, the position of a focus lens in an optical system when the contrast of an image obtained by an image sensor forms a local maximum is found while moving the focus lens in the direction of the optical axis, and is taken as an in-focus position. The in-focus position is typically evaluated based on a shape created by AF evaluation values calculated by extracting a high-frequency component of the image obtained by the image sensor on a frame-by-frame basis, and the same image is displayed in a liquid-crystal display unit and recorded as moving pictures. Accordingly, it has been necessary to generate the image data taking into consideration both the display/moving picture recording and focusing operations in the case where the focusing operations are carried out while displaying an object in the liquid-crystal display unit and carrying out operations for recording moving pictures as described above. As such, the framerate will drop when attempting to generate high-resolution image data according to the requirements for display/moving picture recording, which is disadvantageous in focusing operations that carry out control for reducing the period for which the image is out of focus to the greatest extent possible.

The specification of Japanese Patent No. 4558830 discloses the following digital camera, in order to solve such a problem. An image sensor capable of a process for thinning an image signal of an object and a thinning control unit that controls readout frames and a thinning rate are provided, and control is carried out so that image data is read out at a higher readout framerate during a focusing operation period than during a normal operation period. Furthermore, in the frames during the focusing operation period and immediately before the focusing operation period, control is carried out for reading out image data from the image sensor at a higher thinning rate than that used in the normal operation period. Doing so makes it possible to operate at a framerate suited to focusing operations during the focusing operation period while also maintaining display quality during the normal operation period, and measures are taken to ensure a smooth transition between the two.

Meanwhile, the specification of Japanese Patent No. 4797522 discloses the following digital camera. A light path splitter that splits the optical path of light from an object into two and two image sensors that convert the respective beams of object light obtained from the splitting into image data are provided; one of the image sensors generates a display image, and the other is partially used to handle focusing operations. This makes it possible to carry out focusing operations while maintaining display quality in the normal operation period and the focusing operation period.

However, according to the technique disclosed in the specification of Japanese Patent No. 4558830, the thinning rate in the normal operation period is different from the thinning rate in the focusing operation period, and thus the quality of the image displayed in the liquid-crystal display unit will invariably drop during the focusing operation period. Likewise, there is a problem in that in the case where a moving picture is recorded using this technique, a difference in the quality of the recorded image will remain between the normal operation period and the focusing operation period.

On the other hand, according to the technique disclosed in the specification of Japanese Patent No. 4797522, the display of the object during the normal operation period and the focusing operation during the focusing operation period are realized in respectively optimal forms. However, it is necessary to provide an optical element for branching the optical path, the two image sensors, a driving unit for driving the respective image sensors, and so on, and there is thus a problem in that it is difficult to apply this technique in compact digital cameras, where low costs and downsizing is demanded.

SUMMARY OF THE INVENTION

The present invention has been made in consideration of the above situation, and maintains quality of an image for display and recording while also improving the performance of focusing operations.

According to the present invention, provided is an image capturing apparatus comprising: an image sensor capable of being controlled at different readout intervals in a plurality of different regions; a selection unit configured to select one of a first image signal read out from a first region in the plurality of different regions and a second image signal read out from a second region in the plurality of different regions, that is controlled at a readout interval shorter than those of the first region; a detection unit configured to detect a focus state level based on an image signal read out from the image sensor; and a focus control unit configured to, based on the focus state level detected by the detection unit based on the image signal selected by the selection unit, control a focus lens in an imaging optical system for forming a light image from an object on the image sensor, wherein the first image signal is used for at least one of display in a display unit and storage in a storage medium.

Further, according to the present invention, provided is an image capturing apparatus comprising: an image sensor capable of being controlled to read a first image signals and a second image signal in parallel, wherein the first image signal is read at a predetermined frame rate and the second image signals is read at a frame rate higher than the predetermined frame rate; a selection unit configured to select one of the first image signal and the second image signal that is read at a readout interval shorter than a readout interval of the first image signal; a detection unit configured to detect a focus state level based on an image signal read out from the image sensor; and a focus control unit configured to, based on the focus state level detected by the detection unit based on the image signal selected by the selection unit, control a focus lens in an imaging optical system for forming a light image from an object on the image sensor, wherein the first image signal is used for at least one of display in a display unit and storage in a storage medium.

Furthermore, according to the present invention, provided is a control method for an image capturing apparatus including an image sensor capable of being controlled at different readout intervals in a plurality of different regions, the method comprising: a readout step of reading out a first image signal by controlling a first region in the plurality of different regions, and reading out a second image signal by controlling a second region in the plurality of different regions, at a readout interval shorter than those of the first region; a selection step of selecting one of the first image signal and the second image signal; a detection step of detecting a focus state level based on an image signal read out from the image sensor; and a focus control step of, based on the focus state level detected in the detection step based on the image signal selected by the selection unit, controlling a focus lens in an imaging optical system for forming a light image from an object on the image sensor, wherein control is carried out so that the first image signal is used for at least one of display in a display unit and storage in a storage medium.

Further, according to the present invention, provided is an image capturing apparatus comprising: an image sensor capable of being controlled at different readout intervals in a plurality of different regions; a determination unit configured to determine at least one of a stability level of the image capturing apparatus and a stability level of an object; a photometry unit; a selection unit configured to select one of a first image signal read out from a first region in the plurality of different regions and a second image signal read out from a second region, in the plurality of different regions, that is controlled at a readout interval shorter than those of the first region; a detection unit configured to detect a focus state level based on an image signal read out from the image sensor; and a focus control unit configured to, based on the focus state level detected by the detection unit based on the image signal selected by the selection unit, control a focus lens in an imaging optical system for forming a light image from an object on the image sensor, wherein the selection unit selects the first image signal in the case where a result of the photometry indicates that the object is darker than a predetermined first threshold, selects the second image signal in the case where the object is not darker than the first threshold and the stability level determined by the determination unit is not higher than a predetermined level, selects the first image signal in the case where the stability level is higher than the predetermined level and the focus state level is higher than a predetermined second threshold, and selects the second image signal in the case where the focus state level is less than or equal to the second threshold; and the first image signal is used for at least one of display in a display unit and stored in a storage medium.

Further, according to the present invention, provided is a control method for an image capturing apparatus including an image sensor capable of control at different readout intervals in a plurality of different regions, the method comprising: a determination step of determining at least one of a stability level of the image capturing apparatus and a stability level of an object; a photometry step of carrying out photometry; a readout step of reading out a first image signal by controlling a first region, in the plurality of different regions and reading out a second image signal by controlling a second region, in the plurality of different regions, at a readout interval shorter than those of the first region; a selection step of selecting one of the first image signal and the second image signal; a detection step of detecting a focus state level based on an image signal read out from the image sensor; and a focus control step of, based on the focus state level detected in the detection step based on the image signal selected by the selection unit, controlling a focus lens in an imaging optical system for forming a light image from an object on the image sensor, wherein the selection step selects the first image signal in the case where a result of the photometry indicates that the object is darker than a predetermined first threshold, selects the second image signal in the case where the object is not darker than the first threshold and the stability level determined in the determination step is not higher than a predetermined level, selects the first image signal in the case where the stability level is higher than the predetermined level and the focus state level is higher than a predetermined second threshold, and selects the second image signal in the case where the focus state level is less than or equal to the second threshold; and the first image signal is used for at least one of display in a display unit and stored in a storage medium.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 14A and 14B are diagrams illustrating a relationship between a distance measurement range and a focus state level, and image data input into an AF processing circuit, according to the second embodiment;

DESCRIPTION OF THE EMBODIMENTS

Exemplary embodiments of the present invention will be described in detail in accordance with the accompanying drawings.

First Embodiment
Apparatus Configuration and Basic Operations

Figure 1:
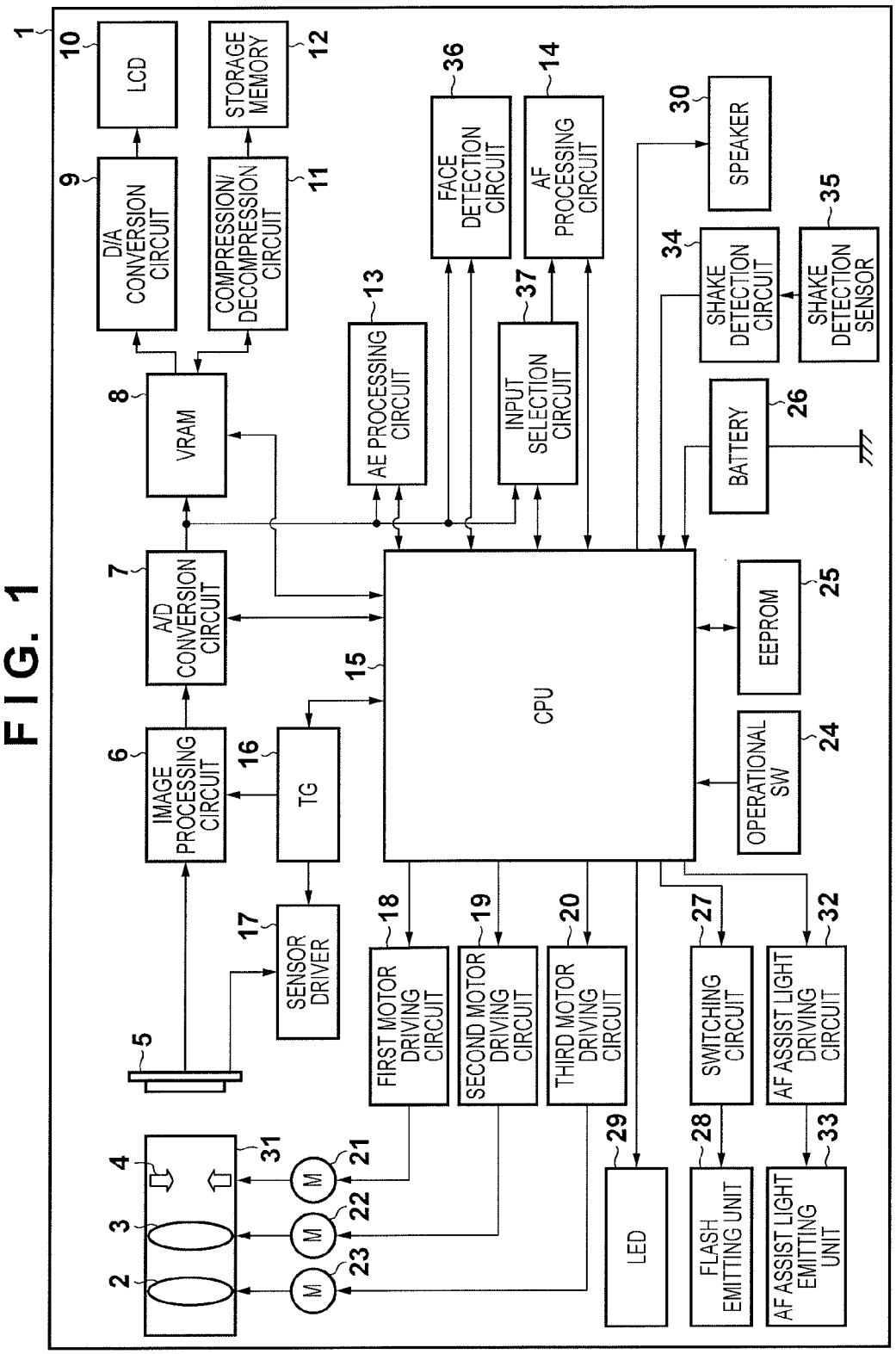
FIG. 1 is a block diagram illustrating the configuration of an image capturing apparatus according to an embodiment of the present invention.

FIG. 1 is a block diagram illustrating the overall configuration of an image capturing apparatus 1, such as a digital still camera or a digital video camera, according to a first embodiment of the present invention. In FIG. 1, an imaging lens unit 31 has a zoom lens group 2, a focus lens group 3, as well as an aperture 4 that controls a light flux amount that traverses an imaging optical system including the zoom lens group 2, the focus lens group 3, and so on. An optical image of an object that has traversed the imaging optical system and whose light amount has been adjusted by the aperture 4 is formed on a light-receiving surface of an image sensor 5; the image sensor 5 photoelectrically converts the optical image of an object that has been formed and outputs an electrical image signal.

An image processing circuit 6 receives the image signal output from the image sensor 5 and performs a variety of image processes thereon, generating an image signal in a predetermined format; an A/D conversion circuit 7 converts an analog image signal generated by the image processing circuit 6 into a digital image signal (image data). The image data output from the A/D conversion circuit 7 is temporarily stored in a memory (a VRAM) 8 such as a buffer memory or the like. A D/A conversion circuit 9 reads out the image data stored in the VRAM 8 and converts that data into an analog image signal, and further converts the analog data into an image signal in a format suited to display; the analog image signal is then displayed in an image display device 10 such as a liquid-crystal display (this will be referred to as an "LCD 10" hereinafter). The LCD 10 can also be used as an electronic viewfinder (EVF) by sequentially displaying images, obtained cyclically by the image sensor 5, through the above procedure.

A compression/decompression circuit 11 is configured of a compression circuit and a decompression circuit; the compression circuit reads out the image data temporarily stored in the VRAM 8 and performs a compression process, an encoding process, and the like in order to convert the image data into a format suited to storage in a storage memory 12. The decompression circuit performs a decoding process, a decompression process, and the like in order to convert the image data stored in the storage memory 12 into a format suited to playback or the like. The storage memory 12 is configured of a semiconductor memory or the like, and stores image data. A semiconductor memory such as a flash memory, a semiconductor memory such as a flash memory that has a card or stick shape and can be removed from the image capturing apparatus 1, or the like is employed as the storage memory 12. A variety of other media, such as magnetic storage media including hard disks, Floppy (registered trademark) disks, or the like can be used as well.

For example, the processing described hereinafter is carried out when, of operational switches 24 that will be described later, a mode toggle switch (not shown) is manipulated so that an image shooting mode is entered, and an exposure and recording operation is then instructed by a release switch being manipulated. First, image data temporarily stored in the VRAM 8 as described above is compressed and encoded by the compression circuit in the compression/decompression circuit 11, and is stored in the storage memory 12. Meanwhile, when a playback mode is entered, playback operations are started, and the following processing is carried out. First, the image data stored in the storage memory 12 in a compressed state undergoes a decoding process, a decompression process, and so on in the decompression circuit of the compression/decompression circuit 11, and is temporarily stored in the VRAM 8. The image data temporarily stored in the VRAM 8 is converted, using the D/A conversion circuit 9, into an analog signal in a format suited to display through the aforementioned processing, and is played back in the LCD 10 as an image.

A CPU 15 includes a memory used for computations, and controls overall operation of the image capturing apparatus 1. An AE processing circuit 13 carries out automatic exposure (AE) processing based on the image data output from the A/D conversion circuit 7. More specifically, the AE processing circuit 13 calculates an AE evaluation value based on the brightness of an object by performing computational processes such as cumulative addition on the luminance values of one screen's worth of image data that has been digitized by the A/D conversion circuit 7. The AE evaluation value is output to the CPU 15.

An AF processing circuit 14 carries out automatic focus adjustment (AF) processing based on the image data output from the A/D conversion circuit 7. More specifically, first, the AF processing circuit 14 uses a band pass filter (BPF) or the like to extract high-frequency components of image data corresponding to a region, in one screen's worth of the image data digitized by the A/D conversion circuit 7, in the area that has been designated as an AF region. The AF processing circuit 14 furthermore carries out computational processes such as cumulative addition on the extracted high-frequency components and calculates an AF evaluation value signal corresponding to a contour component amount and the like in the high frequency range.

Figure 9:
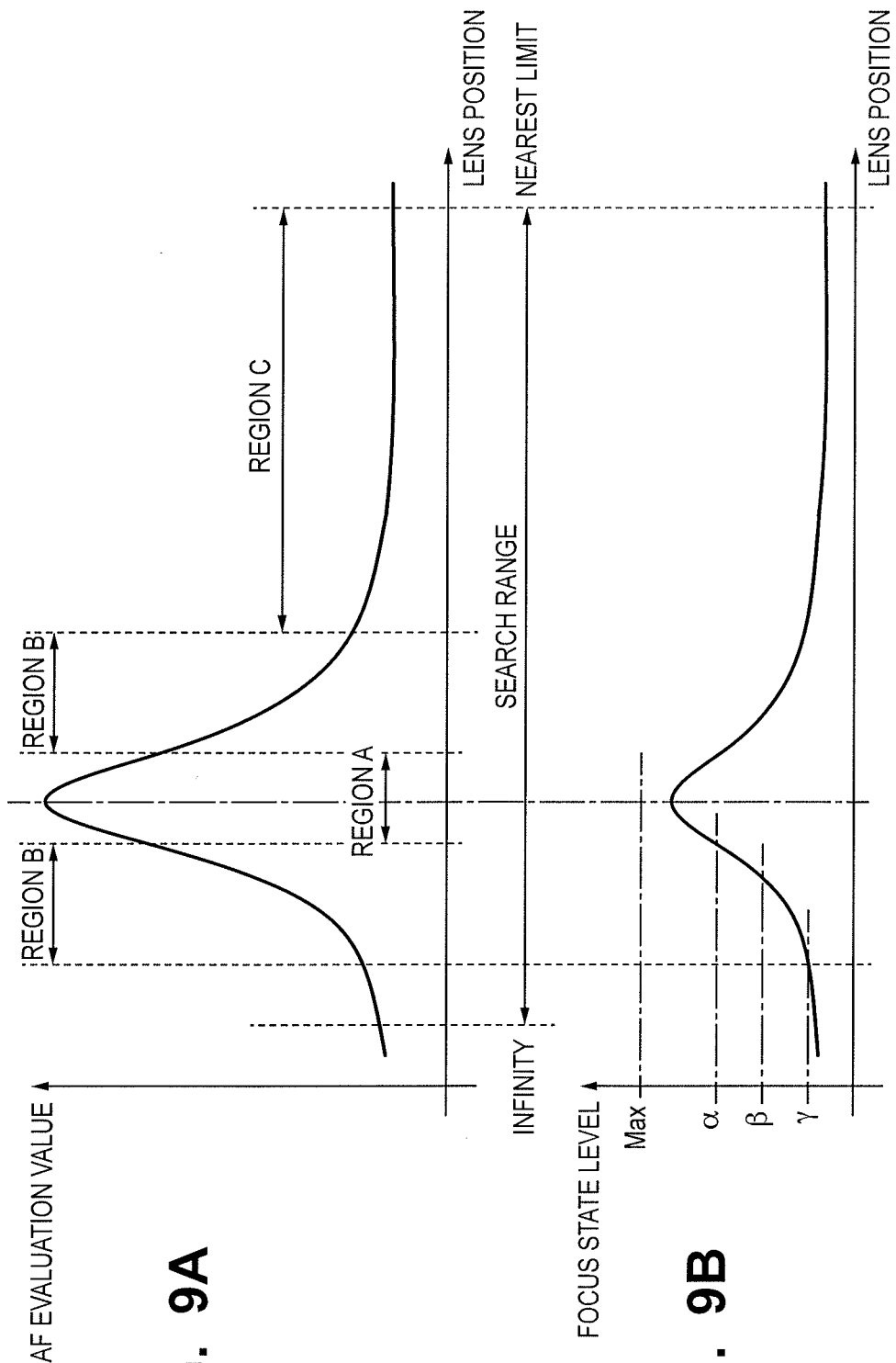
FIGS. 9A and 9B are graphs illustrating a relationship between an AF evaluation value and a focus state level according to the embodiment.

In the present embodiment, the band pass filter (BPF) is configured so as to be capable of extracting a plurality of different frequency components when extracting specific frequency components of the image signal using the band pass filter. At this time, the frequency components extracted from the image signal are assumed to include a high-frequency signal component and a low-frequency signal component, and an AF evaluation value signal calculated from the high-frequency signal component is used in cases that require high accuracy, such as specifying an in-focus position. Furthermore, to determine the focus state level at a specific position, the focus state level is calculated based on the output of the band pass filter in the present embodiment, as mentioned above. The "focus state level" referred to in the present embodiment is a signal normalized by dividing the high-frequency signal component by the low-frequency signal component; as shown in FIG. 9B, the value of the signal approaches 1 (Max, in FIG. 9B) near the in-focus position, and decreases when moving away from the in-focus position. In the present embodiment, this is used as an index representing a simplified focus state level at a position corresponding to the AF evaluation value. The AF region may be set at a single location in a central area or an arbitrary area of the screen, a plurality of locations in a central area or an arbitrary area of the screen and adjacent thereto, a plurality of discretely distributed locations, or the like.

A face detection circuit 36 receives the image data output from the A/D conversion circuit 7, searches out characteristic areas of the face, such as the eyes, eyebrows, or the like, and finds the position of a person's face in the image. The size, tilt, and so on of the face is also found from positional relationships such as the distances between characteristic areas of the face.

A timing generator (TG) 16 generates a predetermined timing signal. A sensor driver 17 drives the image sensor 5 based on the timing signal from the TG 16. The TG 16 outputs a predetermined timing signal to the CPU 15, the image processing circuit 6, and the sensor driver 17, and the CPU 15 carries out various types of control in synchronization with this timing signal. The image processing circuit 6 receives the timing signal from the TG 16 and performs various types of image processes, such as color signal separation, in synchronization therewith. Furthermore, the sensor driver 17 receives the timing signal from the TG 16 and drives the image sensor 5 in synchronization therewith.

A first motor driving circuit 18 drives the aperture 4 by driving an aperture driving motor 21 under the control of the CPU 15. A second motor driving circuit 19 drives the focus lens group 3 by driving a focus driving motor 22 under the control of the CPU 15. A third motor driving circuit 20 drives the zoom lens group 2 by driving a zoom driving motor 23 under the control of the CPU 15.

The CPU 15 controls the first motor driving circuit 18, the second motor driving circuit 19, and the third motor driving circuit 20. The driving of the aperture 4, the focus lens group 3, and the zoom lens group 2 is controlled via the aperture driving motor 21, the focus driving motor 22, and the zoom driving motor 23, respectively, as a result. The CPU 15 carries out AE control by finding a charge accumulation period and an aperture value at which an appropriate exposure amount is obtained based on the AE evaluation value and the like calculated by the AE processing circuit 13, controlling the first motor driving circuit 18 and driving the aperture driving motor 21, and adjusting the aperture value of the aperture 4 to an appropriate value.

The CPU 15 also controls the second motor driving circuit 19 to drive the focus driving motor 22 based on the AF evaluation value calculated by the AF processing circuit 14. Through this, AF control that moves the focus lens group 3 to an in-focus position is carried out. Meanwhile, in the case where a zoom switch (not shown) in the operational switches 24 has been manipulated, the CPU 15 carries out magnification operations (zoom operations) of the imaging optical system in response thereto by controlling the third motor driving circuit 20 to control the driving of the zoom driving motor 23, thereby moving the zoom lens group 2 as a result.

The operational switches 24 are configured of various types of switches, and include the following switches, for example. First, there are a main power switch for starting the image capturing apparatus 1 and supplying power thereto, a release switch for starting shooting operations (storage operations) and the like, a playback switch for starting playback operations, and the zoom switch for instructing changes in a zoom ratio, or in other words, for instructing the zoom lens group 2 to move. There is also an optical viewfinder (OVF)/electronic viewfinder (EVF) toggle switch and the like. In the present embodiment, the release switch is configured of a two-stage switch that has a first stroke (referred to as "SW1" hereinafter) and a second stroke (referred to as "SW2" hereinafter). When SW1 turns on, an instruction signal for starting AE processing and AF processing is generated prior to the start of image capture operations. Then, when SW2 turns on, an instruction signal for starting exposure and recording operations, in which an image is shot and recorded, is generated.

An EEPROM 25 is a read-only memory that can be electrically rewritten, and that stores, in advance, programs for carrying out various types of control, data used to perform various types of operations, and so on. Reference numeral 26 indicates a battery; 28, a flash emitting unit; 27, a switching circuit that controls the emission of flash light by the flash emitting unit 28; 29, a display element, such as an LED, used for displaying warnings and the like; and 30, a speaker for carrying out audio-based guidance, warnings, and the like.

An AF assist light emission unit 33 is configured of a light source such as an LED that illuminates part or all of an object when obtaining the AF evaluation value, and an AF assist light driving circuit 32 drives the AF assist light emission unit 33.

A shake detection sensor 35 detects camera shake and a shake detection circuit 34 processes a signal from the shake detection sensor 35. The face detection circuit 36 receives the output from the A/D conversion circuit 7 and detects a position, size, and so on of a face in the screen. The face detection circuit 36 searches out characteristic areas of the face, such as the eyes, eyebrows, or the like, and finds the position of a person's face in the image. The size, tilt, and so on of the face is also found from positional relationships such as the distances between characteristic areas of the face.

An input selection circuit 37 selects which image data to input into the AF processing circuit 14 in the case where there are a plurality of pieces of image data digitized through the A/D conversion circuit 7.

Next, the configuration of pixels provided in the image sensor 5 shown in FIG. 1 will be described with reference to FIG. 2. Note that although FIG. 2 indicates four pixels arranged in the vertical direction, in actuality, the image sensor 5 includes an extremely large number of pixels arranged two-dimensionally.

A pixel 201 receives light from the lens unit 31 and converts light incident on the surface thereof and outputs the result as an electrical signal. The pixel 201 includes a photodiode 202, a transfer transistor 203, an amplifier 204, and a reset transistor 205. The transfer transistor 203 and the reset transistor 205 operate in response to signals from a vertical scanning circuit 206. The vertical scanning circuit 206 includes a shift register, a signal generating circuit that generates driving signals for the transfer transistor 203 and so on to drive the respective pixels, and the like. By controlling the transfer transistor 203 and the reset transistor 205 using the generated driving signals (TX1 to 4, RS1 to 4, and so on), a charge in the photodiode 202 can be reset or read out, thereby controlling a charge accumulation period.

Meanwhile, a horizontal scanning circuit 209 includes a shift register, a line amp circuit 210, a signal output selection switch 211, an output circuit (not shown) for output to the exterior, and so on. The signals read out from the pixel can be amplified by changing settings of the line amp circuit 210 through a signal from the sensor driver 17.

Figure 2:
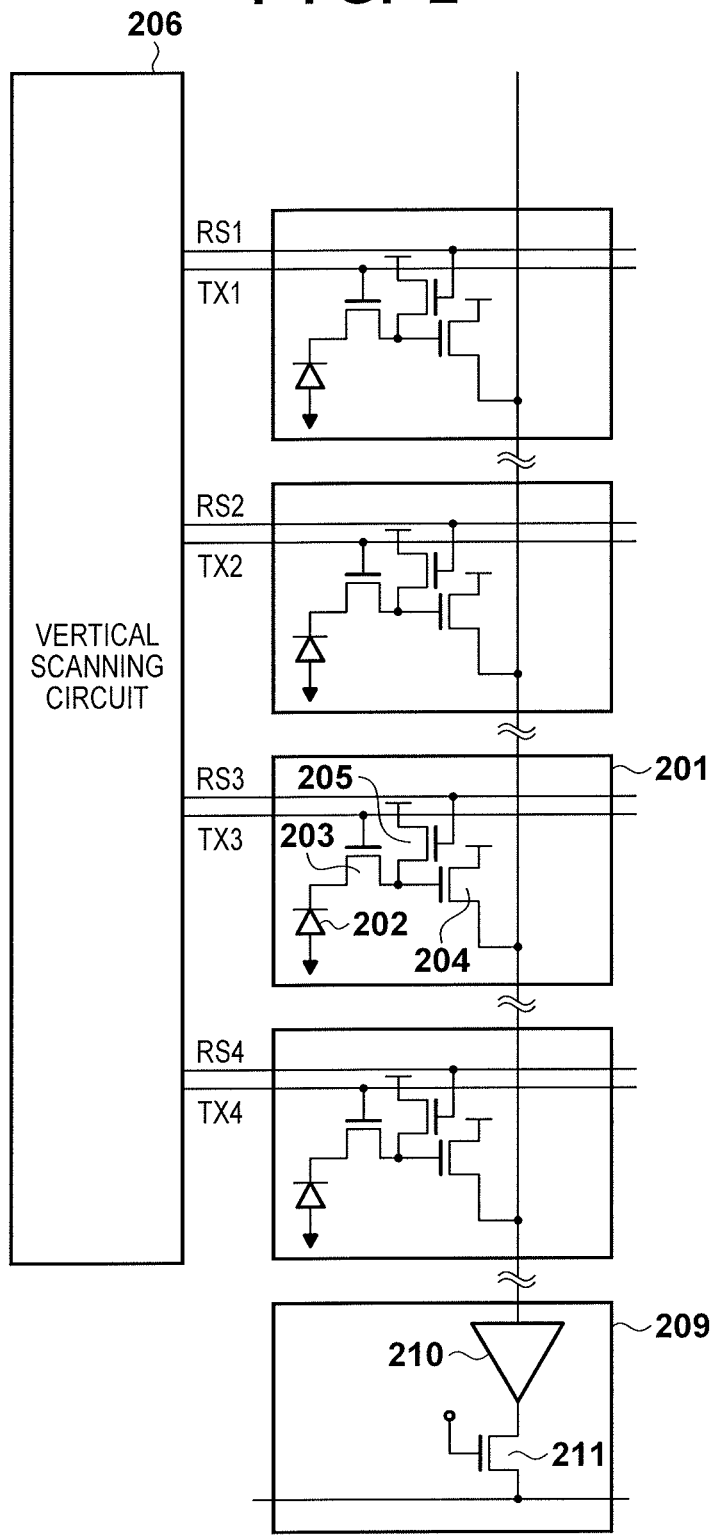
FIG. 2 is a diagram illustrating the configuration of pixels provided in the image capturing apparatus according to the embodiment.
Figure 3:
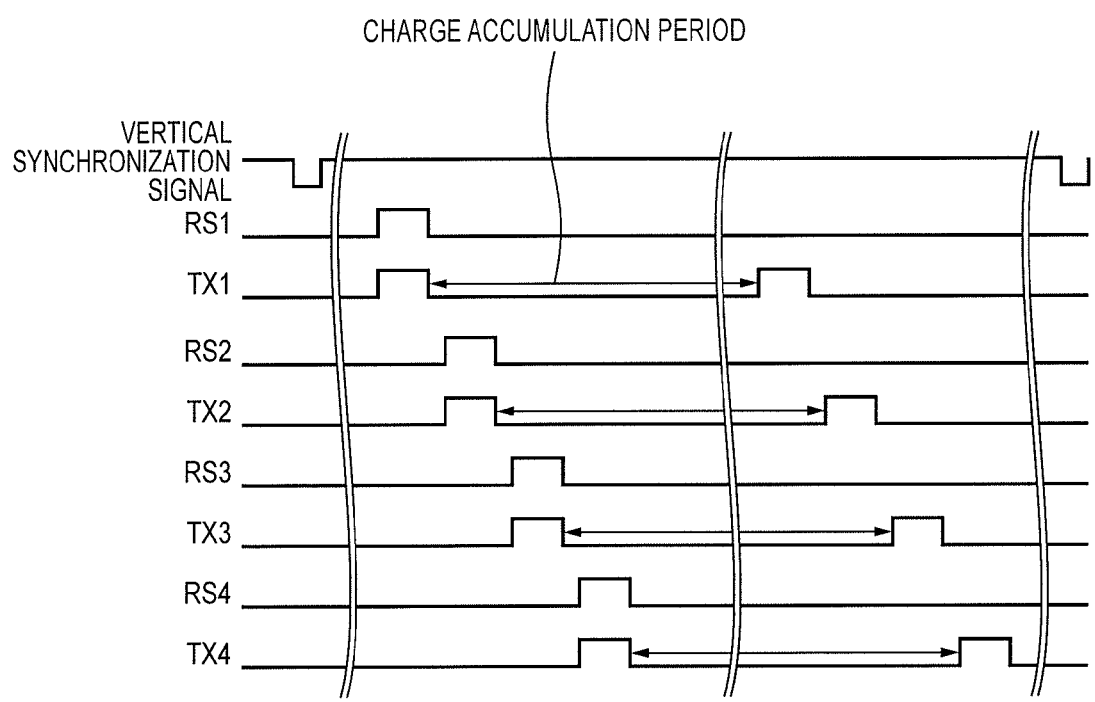
FIG. 3 is a timing chart illustrating signals output from a vertical scanning circuit when obtaining an image.

Next, typical control of the image sensor 5 having pixels configured as shown in FIG. 2, performed when obtaining image data for display and recording, will be described with reference to FIGS. 3 and 4. FIG. 3 is a timing chart illustrating signals generated by the vertical scanning circuit 206 when obtaining an image. Exposure and signal readout are carried out based on vertical synchronization signals generated by the TG 16 and the sensor driver 17.

When both a TX signal (TX1 to 4) and an RS signal (RS1 to 4) in each row become high, the charge in the photodiode 202 of each pixel is reset, whereas charge accumulation starts when both the TX signal and the RS signal become low. This operation is carried out sequentially according to a predetermined order under conditions set by the TG 16. Then, after a predetermined charge accumulation period has passed, the TX signal becomes high again, and the charge in the photodiode 202 is read out to a gate of the amplifier 204. An image signal is generated from the signal from the amplifier 204 and is output through the horizontal scanning circuit 209. This operation is also carried out under conditions set by the TG 16.

In the present embodiment, the image sensor 5 provided in the image capturing apparatus 1 is a CMOS image sensor. Accordingly, depending on the settings of the shift register in the vertical scanning circuit 206, it is possible to select in what order to drive the transfer transistors 203 of a given row; furthermore, the same row can be selected repeatedly and the signals read out therefrom. Furthermore, depending on the settings of the shift register in the horizontal scanning circuit 209, it is possible to select which column signal output will start from among signals in the same row, by causing the selection switch 211 of that column to operate. Through this, the order in which signals are to be read out can be specified, as can the pixel within the screen from which the readout is to start.

Figure 4:
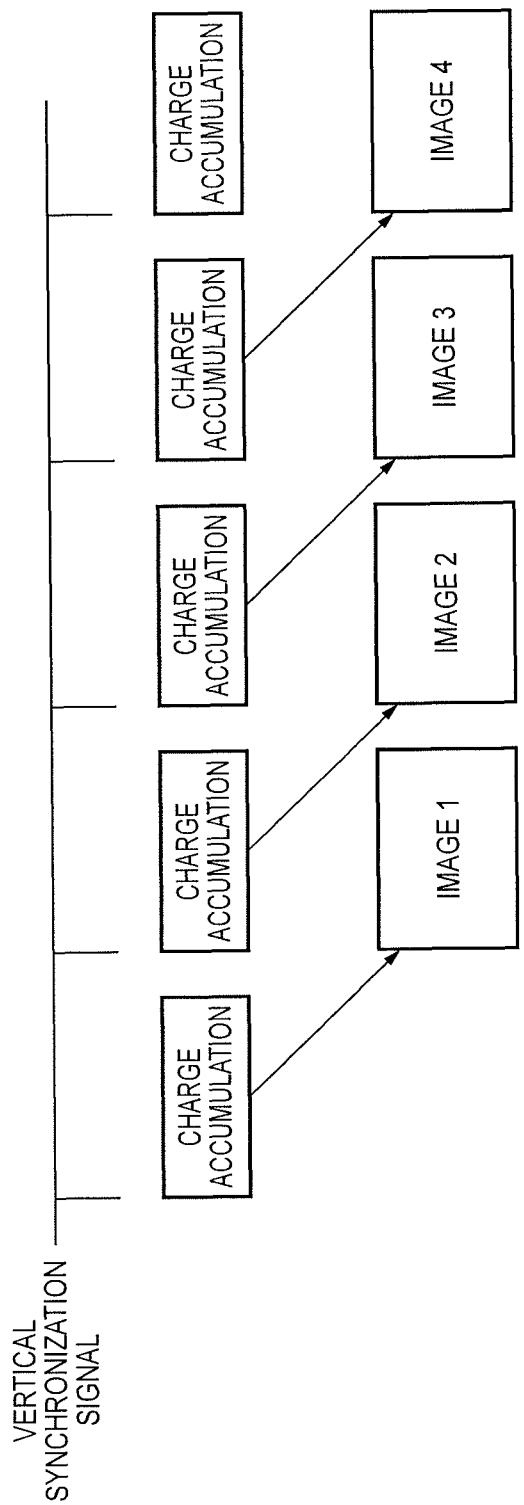
FIG. 4 is a diagram illustrating charge accumulation periods and image readout timings.

FIG. 4 illustrates charge accumulation periods and the timings at which accumulated charges are read out as images. Exposure and signal readout are carried out based on vertical synchronization signals generated by the TG 16 and the sensor driver 17.

Overall Shooting Operations

Figure 5:
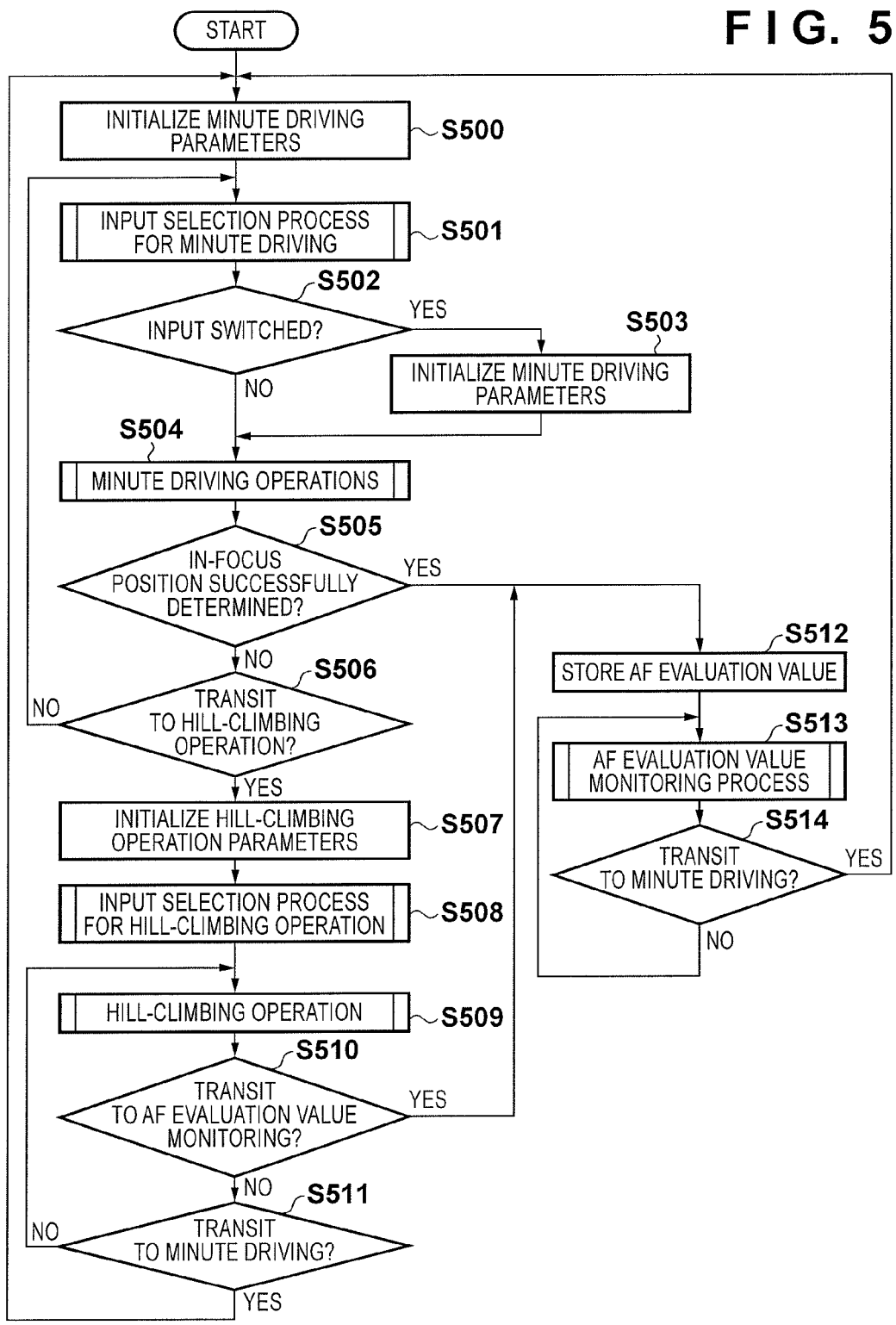
FIG. 5 is a flowchart illustrating an overall flow of AF operations according to the embodiment.

Next, an overall flow of AF operations according to the first embodiment will be described using the flowchart in FIG. 5. It is assumed that the AF operations in the first embodiment are carried out during moving picture recording, during standby, and while standing by to shoot a still image. Meanwhile, a shooting process is executed and power is supplied to the image sensor 5 and the like to enable images to be captured when the main power switch of the image capturing apparatus 1 is on and an operating mode of the image capturing apparatus is set to a shooting (recording) mode. At this time, the CPU 15 displays an image that has traversed the lens unit 31 and been formed on the image sensor 5 as an image on the LCD 10. In other words, an object image that has been formed on the image sensor 5 is converted into an electrical signal by the image sensor 5 through a photoelectric conversion process, and the signal is then output to the image processing circuit 6. There, various types of signal processes are carried out on the input signal and a predetermined image signal is generated; the image signal is then output to the A/D conversion circuit 7, converted in a digital signal (image data), and temporarily stored in the VRAM 8. The image data stored in the VRAM 8 is output to the D/A conversion circuit 9 and converted into an analog signal, converted into an image signal in a format suited for display, and displayed on the LCD 10 as an image.

Note that the processing illustrated in the flowchart according to the first embodiment is realized as a computer program (software) stored in the EEPROM 25. The processing is executed primarily by the CPU 15 after the power is turned on by the power switch of the operational SW 24 being manipulated and the image capturing apparatus 1 being started up.

Note that in the following descriptions, an operation for obtaining the AF evaluation value while moving the focus lens group 3 is referred to as "scanning", a position of the focus lens group 3 where the AF evaluation value is obtained is referred to as a "scan position", and an interval between scan positions is referred to as a "scanning interval". Furthermore, a range for obtaining the AF evaluation value (in other words, a range across which the focus lens group 3 is moved) will be referred to as a "scan range".

First, in S500, internally-used parameters are initialized prior to carrying out minute driving operations. The specific parameters initialized here are a region for comparing a most recent AF evaluation value, a counter value for specifying a direction, and so on.

Next, in S501, an input selection process for minute driving is carried out. Here, image data input primarily to the AF processing circuit 14 is set using the input selection circuit 37; in the present embodiment, one of two inputs is selected, namely image data for display in the LCD 10 or for recording a moving picture, and image data specialized for AF purposes. Details of the processing performed in S501 will be given later.

In S502, it is determined whether or not the input was switched in S501; in the case where the input was switched, in S503, the minute driving parameters are initialized in the same manner as in S500, after which the process moves to S504. On the other hand, the process moves to S504 in the case where the input was not switched in S502.

In S504, minute driving operations are carried out, and it is determined whether or not the scene is in focus or out of focus, and in which direction to move in order to bring the scene into focus. In the minute driving, the focus lens group 3 is moved in fine amounts (amounts by which a change in the focus cannot be noticed in the LCD 10, in recorded moving pictures, or the like) in the direction of the nearest limit or in the direction of infinity. Whether or not the scene is in focus or out of focus, in which direction to move the focus lens group 3 in order to bring the scene into focus, and so on are detected based on an AF evaluation value obtained as a result. Note that details of these operations will be given later.

In the case where it is determined as a result of the minute driving operations performed in S504 that the scene is in focus, the process advances from S505 to S512, where processing for when a scene is in focus is carried out, whereas in the case where it is not determined in S504 that the scene is in focus, the process moves from S505 to S506. In S506, it is determined whether or not to transit to hill-climbing operation. Specifically, this corresponds to a case where the direction in which the scene will come into focus has been successfully determined in S504 or a case where the scene is not in focus and a direction in which the scene will come into focus has not been specified, and in such cases, the process moves to S507 and the process for hill-climbing operation begins. On the other hand, when neither of these cases applies in S504, the process returns to S501 and the minute driving operations continue.

In S507, internally-used parameters are initialized prior to carrying out hill-climbing operation. The specific parameters initialized here are a region for comparing a most recent AF evaluation value, a counter value for counting a number of times the end of a range limit for the focus lens group 3 has been reached, and so on. Then, in S508, an input selection process for hill-climbing operation is carried out. Although details will be given later, the image data input to the AF processing circuit 14 is set using the input selection circuit 37, in the same manner as in S501.

In S509, the lens is driven through hill-climbing operation quickly in the direction in which the AF evaluation value increases. In the present embodiment, "hill-climbing operation" searches for the in-focus position while changing the scanning interval in accordance with the focus state level during the hill-climbing operation. The scanning is carried out at a comparatively rough scanning interval of a depth of 5, for example, in the case where the focus state level is low; the scanning interval is then reduced as the focus state level increases, and the scanning is carried out at a comparatively fine scanning interval of a depth of 2 to 4, for example, near the in-focus position. The processing carried out in S509 will be described in detail later.

In S510, the process moves to S512 in the case where the process of S509 results in the scene being out of focus and a condition for transiting to an AF evaluation value monitoring process is met, whereas the process moves to S511 when such is not the case. In S511, the process moves to S500 in the case where a condition for transiting to the minute driving operations is met in S509, whereas the process returns to S509 when such is not the case, and the hill-climbing operation is continued.

Meanwhile, in S512, an AF evaluation value that serves as a reference when monitoring changes in the AF evaluation value is held. In S513, an AF evaluation value monitoring process that compares the latest AF evaluation values with the AF evaluation value stored in S512 is carried out. In the case where, as a result of S513, it is determined in S514 to transit to the minute driving operations, or in other words, that some kind of change has been detected in the AF evaluation value and focusing is to be resumed, the process moves to S500. On the other hand, the process returns to S513 from S514 in the case where a predetermined amount of change in the AF evaluation value has not occurred, and changes in the AF evaluation value are cyclically monitored in the AF evaluation value monitoring process. This concludes the overall flow of the AF operations shown in FIG. 5.

Minute Driving Operations

Figure 6:
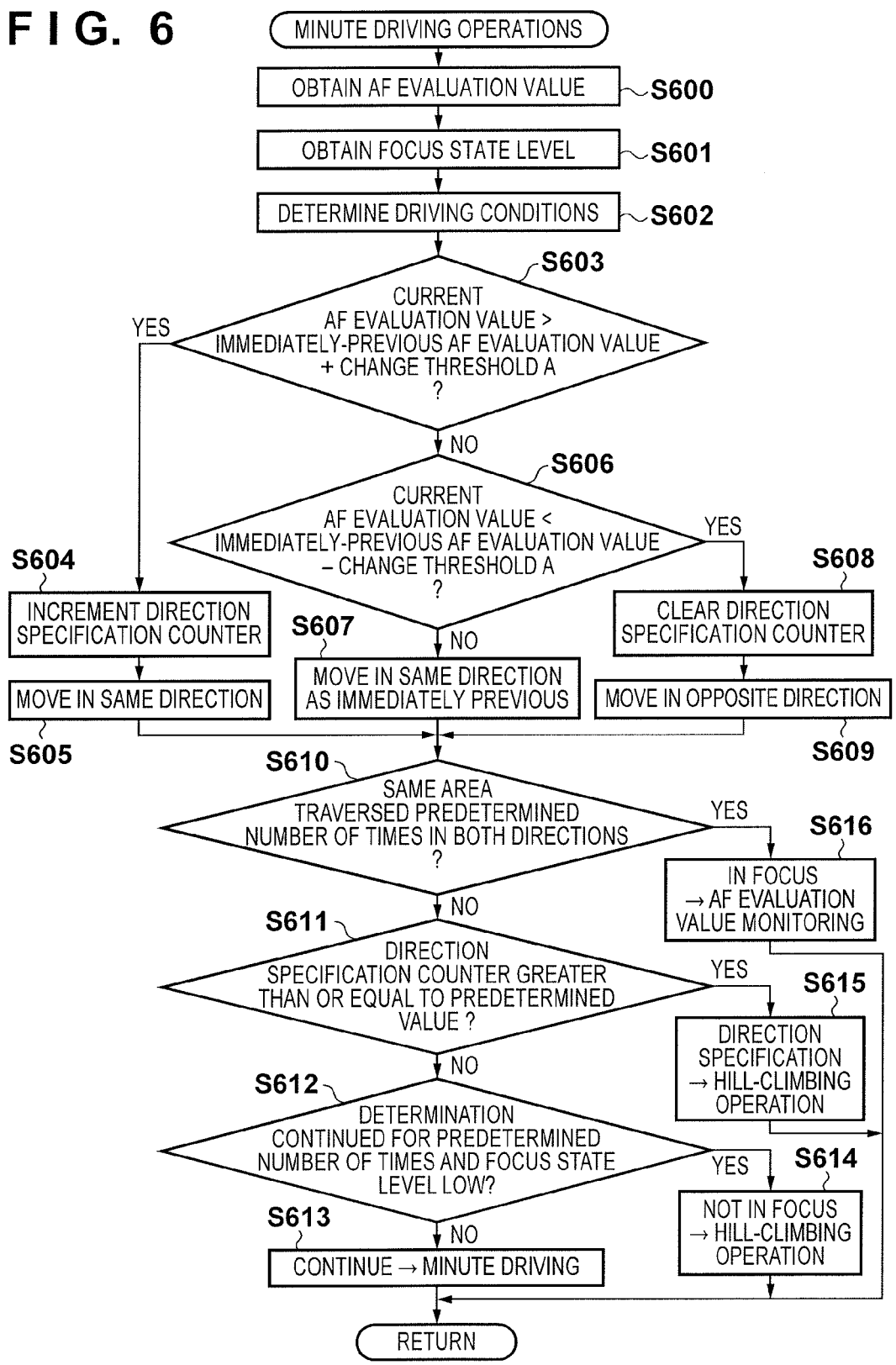
FIG. 6 is a flowchart illustrating a flow of minute driving operations according to the embodiment.

Next, the minute driving operations carried out in S504 of FIG. 5 will be described using the flowchart in FIG. 6. "Minute driving operations" refers to a focus adjustment method that specifies the direction of an in-focus position as well as the in-focus position itself based on changes in the AF evaluation value obtained by moving the focus lens group 3 intermittently at minute intervals.

First, in S600, the CPU 15 obtains the AF evaluation value from the AF processing circuit 14. Likewise, in S601, the focus state level is obtained. Next, in S602, a movement amount for the minute driving (that is, the scanning interval) is determined. The present embodiment achieves stable focus tracking during the minute driving operations by moving the focus lens group 3 less the closer the position is to the in-focus position and more the farther the position is from the in-focus position. Accordingly, the amount by which the focus lens group 3 is moved is determined in accordance with the focus state level obtained in S601. For example, in the case where a threshold for the focus state level is set to a relationship of $\alpha > \beta > \gamma$ as shown in FIG. 9B, the movement amount follows the relationships indicated below.

current focus state level is greater than $\alpha$: movement amount=Step1 current focus state level is greater than $\beta$ but less than or equal to $\alpha$: movement amount=Step2 current focus state level is greater than $\gamma$ but less than or equal to $\beta$: movement amount=Step3 current focus state level is less than or equal to $\gamma$: movement amount=Step4

(Step1<Step2<Step3<Step4)

With respect to the speed of the focus driving motor 22 when moving the focus lens group 3, a speed that does not affect the audio of moving pictures recorded during moving picture recording is employed. During live view display for still images, the speed is set to no greater than the maximum allowable speed for the focus driving motor 22, while also taking into consideration driving noise, vibrations, and so on.

Next, in S603, it is determined whether or not the current AF evaluation value is greater than the immediately-previous AF evaluation value plus a change threshold A. The change threshold A is a threshold for determining that the AF evaluation value has clearly risen, and is set taking into consideration variations caused by a noise component, in addition to the actual amount by which the AF evaluation value has increased. In the case where the condition of S603 is met and a rising trend is detected in the AF evaluation value, the process moves to S604, where a direction specification counter is incremented. The direction specification counter is used when specifying the direction of the in-focus position, and a higher value for the counter indicates that the AF evaluation value is rising in a stable manner as the position moves toward the in-focus position. Next, in S605, the focus lens group 3 is moved from the current position by an amount equivalent to the movement amount determined in S602. The direction of movement at this time is the same as the direction immediately previous thereto.

On the other hand, the process moves to S606 in the case where the AF evaluation value does not meet the condition of S603. In S606, it is determined whether or not the current AF evaluation value is less than the immediately-previous AF evaluation value minus the change threshold A. Opposite to S603, this detects a decreasing trend in the AF evaluation value. In the case where the condition is met, the process moves to S608, where the direction specification counter is cleared. Then, in S609, the focus lens group 3 is moved from the current scanning position, in the opposite direction from the immediately-previous direction, by an amount equivalent to the movement amount determined in S602.

In the case where the condition of S606 is not met, the process moves to S607, where the focus lens is moved from the current scanning position, in the same direction as the immediately-previous direction, by an amount equivalent to the movement amount determined in S602. In this case, a clear increase in the AF evaluation value cannot be detected, and thus the direction specification counter operations are not carried out.

Next, in S610, it is determined whether or not the same area has been traversed in both directions a predetermined number of times. For example, in the case where the position has closed in on the in-focus position as indicated by a region A in FIG. 9A, the AF evaluation value decreases when the in-focus position is passed during the minute driving operations, and reverses at the timing of the next control. Continuing such operations ultimately results in operations that traverse the in-focus position in both directions. When the same area has been traversed in both directions the predetermined number of times, the process moves to S616, where a determination of "in focus" is made. In the case where this determination is made, the next state is set to the AF evaluation value monitoring process.

On the other hand, the process moves to S611 in the case where it is determined that the condition is not met, and it is then determined whether the direction specification counter is greater than or equal to a predetermined value. In the case where the counter is greater than or equal to the predetermined value, the process moves to S615, where a determination of "direction specified" is made. In the case where this determination has been made, the next state is set to the hill-climbing operation.

On the other hand, in the case where it is determined that the condition is not met, the process moves to S612; there, it is determined whether the series of minute driving operation processes has been performed a predetermined number of times, and whether or not the focus state level obtained in S601 is less than a predetermined threshold. For example, a case where there is little change in the AF evaluation value, and the in-focus position, the direction thereof, and so on cannot be specified within a predetermined number of times, as indicated by a region C in FIG. 9A, can be considered. This can be thought of as corresponding to a case where the scan range is broad and the in-focus position cannot be found due to the current position being too far from the in-focus position, or the actual in-focus position being outside of the scan range. In such a case, it is difficult to obtain the in-focus position and the direction thereof even if the minute driving operations are continued, and thus in such a case, the process moves to S614, where a determination of "not in focus" is made. In the case where this determination has been made, the next state is set to the hill-climbing operation.

On the other hand, the process moves to S613 in the case where it is determined that the condition is not met, and it is determined that the minute driving operations are to be continued. In the case where this determination is made, the minute driving operations are continued without changing the next state. In the processing from S610 to S616, changes in the cyclically-obtained AF evaluation value are detected and determination results are output based thereon during the minute driving operations. When the aforementioned processing ends, the process returns to that shown in FIG. 5.

Hill-Climbing Operation

Figure 7:
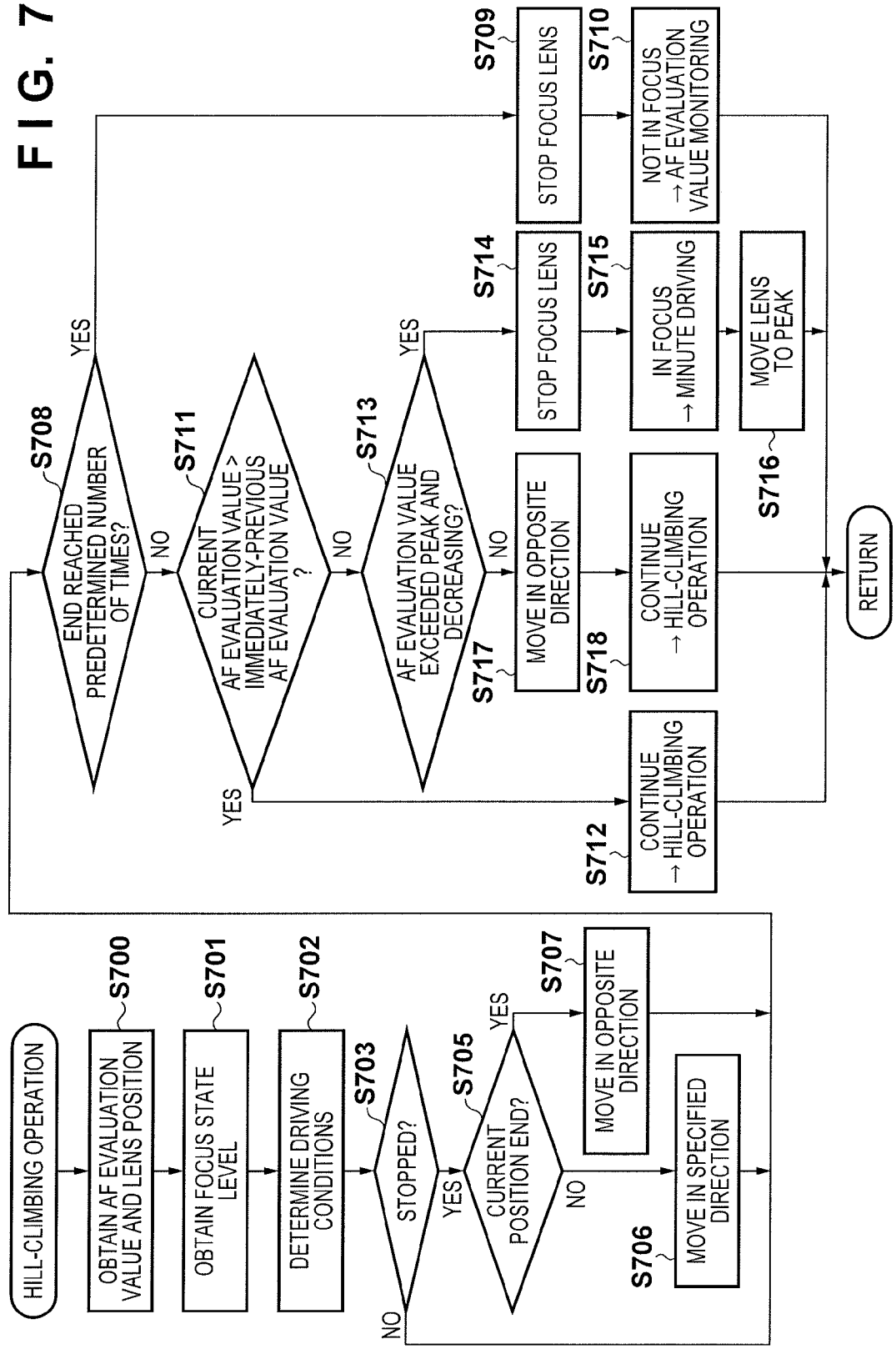
FIG. 7 is a flowchart illustrating a flow of hill-climbing operation according to the embodiment.

Next, processing performed in the hill-climbing operation carried out in S509 of FIG. 5 will be described using the flowchart in FIG. 7. "Hill-climbing operation" refers to a focus adjustment method that specifies an in-focus position based on changes in a plurality of AF evaluation values obtained by moving the focus lens group 3 continuously.

First, in S700, a focus lens position corresponding to an AF evaluation value is obtained. Then, in S701, the focus state level is obtained. In S702, a movement speed of the focus lens group 3 for the hill-climbing operation is determined. The present embodiment achieves stable focus tracking during the hill-climbing operation by moving the focus lens group 3 slower the closer the position is to the in-focus position and faster the farther the position is from the in-focus position. Accordingly, the speed at which the focus lens group 3 is moved is determined in accordance with the focus state level obtained in S701. For example, in the case where a threshold for the focus state level is set to the relationship of $\alpha > \beta > \gamma$ as shown in FIG. 9B, the movement amount of the focus lens group 3, based on a cycle in which the AF evaluation values are generated by the AF processing circuit 14, follows the relationships indicated below.

current focus state level is greater than $\alpha$: movement amount=Step5 current focus state level is greater than $\beta$ but less than or equal to $\alpha$: movement amount=Step6 current focus state level is greater than $\gamma$ but less than or equal to $\beta$: movement amount=Step7 current focus state level is less than or equal to $\gamma$: movement amount=Step8

(Step5<Step6<Step7<Step8)

Note that the cycle at which the AF evaluation value is generated by the AF processing circuit 14 changes depending on the input cycle of image data to the AF processing circuit 14 (that is, a cycle in which the image data is generated). This is determined by the input selection process performed in S508 shown in FIG. 5, and thus a movement speed per single cycle is calculated and set based on the aforementioned movement amount in the input cycle of the image data.

Next, in S703, it is determined whether or not the focus lens group 3 is currently stopped. The focus lens group 3 being stopped indicates that it is immediately after the operations have transited from minute driving operations to hill-climbing operation, or that the focus lens group 3 has reached an end of the scan range during the hill-climbing operation. Accordingly, in S705, it is determined whether or not the current lens position corresponds to the end of the scan range. In the case where it is determined that the current lens position corresponds to the end in S705, the process moves to S707, where the direction of travel is set to the opposite direction from the end and the focus lens group 3 begins to move.

On the other hand, the process moves to S706 in the case where the condition of S705 is not met. The condition of S706 corresponds to a case where it is immediately after the operations have transited from the minute driving operations to the hill-climbing operation, and the focus lens group 3 begins to move in the same direction as the direction of travel in the minute driving operations.

Next, in S708, it is determined whether the end has been reached a predetermined number of times. In the case where at least both ends of the scan range have been reached and the in-focus position cannot be specified, it can be thought that the entire scan range is as indicated by the region C in FIG. 9A and there is little change in the AF evaluation value, and that the in-focus position is outside of the scan range of the focus lens group 3. Large focus fluctuations will repeat in the case where hill-climbing operation is continued under such conditions, and thus to avoid such a state, in the case where the condition of S708 is met, the process moves to S709 and the focus lens group 3 is stopped. Then, in S710, the determination result for the hill-climbing operation is determined as "out of focus" and the state to transit to next is set to the AF evaluation value monitoring process.

The process advances to S711 in the case where the condition of S708 is not met. In S711, the current AF evaluation value is compared with the immediately-previous AF evaluation value, and it is determined whether or not the current value is greater than the immediately-previous value. In the case where the current value is greater than the immediately-previous value, the process moves to S712, where a determination of "continue" is made for the hill-climbing operation; as such, the processing for hill-climbing operation continues to be executed. In other words, in the case where an increasing trend has been successfully detected in the AF evaluation value, such as the case where the hill-climbing operation is being executed in the correct direction toward the actual in-focus position as indicated by a region B in FIG. 9A, the hill-climbing operation continues to be carried out in that direction.

The process advances to S713 in the case where the condition of S711 is not met. In S713, it is determined whether or not the AF evaluation value has passed a peak and started to decrease. Specifically, this corresponds to a case where the hill-climbing operation is carried out moving from the region B to the region A in FIG. 9A; in this case, the process moves to S714 and the focus lens group 3 is stopped. Thereafter, a determination of "in focus" is made for the hill-climbing operation in S715, and the state to transit to next is set to the minute driving operations. Then, in S716, the focus lens group 3 is moved to a peak position of the AF evaluation value.

The process advances to S717 in the case where the condition of S713 is not met. Specifically, this corresponds to a case where the hill-climbing operation is carried out in the opposite direction from the in-focus position in the region B in FIG. 9A; in S717, the direction in which the focus lens group 3 is moving is reversed. Then, in S718, a determination of "continue" is made for the hill-climbing operation; as such, the processing for hill-climbing operation continues to be executed. In the processing from S708 to S718, changes in the cyclically-obtained AF evaluation value are detected and determination results are output based thereon during the hill-climbing operation. When the aforementioned processing ends, the process returns to that shown in FIG. 5.

AF Evaluation Value Monitoring Process

Figure 8:
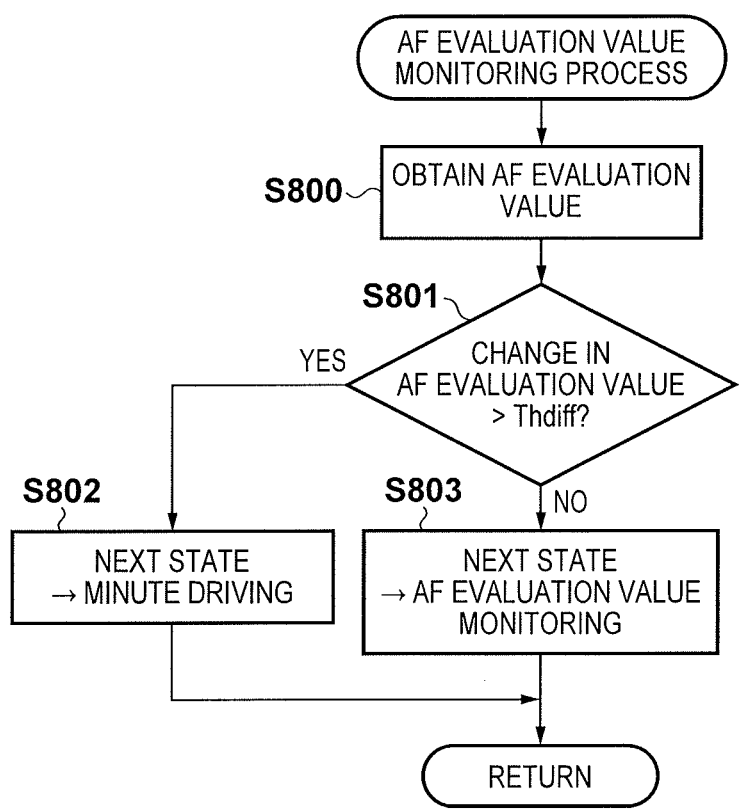
FIG. 8 is a flowchart illustrating a flow of an AF evaluation value monitoring process according to the embodiment.

Next, processing performed in the AF evaluation value monitoring process carried out in S513 of FIG. 5 will be described using the flowchart in FIG. 8. The AF evaluation value monitoring process is a process for detecting whether or not the current AF evaluation value has deviated from a pre-stored AF evaluation value.

First, in S800, the AF evaluation value is obtained. Next, in S801, the AF evaluation value stored in S512 of FIG. 5 is compared with the latest AF evaluation value, and it is determined if the AF evaluation value has changed by more than a predetermined threshold Thdiff. If the AF evaluation value has changed by more than the threshold Thdiff, the process moves to S802, where the next state to transit to is set to the minute driving operations. On the other hand, if the AF evaluation value has changed by less than or equal to the threshold Thdiff in S801, the process moves to S803, where the next state to transit to is set to the AF evaluation value monitoring process so that the AF evaluation value monitoring process is continued. Thus in the case where the AF evaluation value is stable with little fluctuation, the AF evaluation value monitoring process is executed continuously in a cyclical manner, as indicated by the flow of the series of processes from S508 to S510 in FIG. 5. When the aforementioned processing ends, the process returns to that shown in FIG. 5.

Input Selection Process

Next, the input selection process carried out in S501 and S508 of FIG. 5 will be described. In the present embodiment, image data used for display in the LCD 10, used for recording into a recording medium as a moving picture, and so on, and image data suited for use during AF operations, when higher responsiveness is required, are obtained by exposing the image sensor 5 at different exposure conditions and by reading at different readout rates (readout intervals). Hereinafter, the former will be referred to as image data A and the latter as image data B. In the present embodiment, the image data A for display/recording and the image data B suited to AF operations are set to have different numbers of lines in the vertical direction, and the size relationship between the two is set to image data A>image data B. A reason for this is that the AF evaluation value is obtained by extracting high-frequency components of the image data, corresponding to a partial region of the screen specified as an AF region by the AF processing circuit 14, using a band pass filter and performing cumulative addition thereon. Meanwhile, if the configuration is such that the band pass filter can carry out filtering in the vertical direction in which the difference in line numbers arises between the image data A and B, and the output thereof is reflected in the AF evaluation value signal, the image data A, which has a higher number of lines, will be more useful, in terms of focus accuracy, than the image data B. In other words, a difference in characteristics is produced, as indicated below.

number of vertical lines: image data A>image data B

S/N rank: image data A>image data B accuracy rank: image data A>image data B readout rate speed: image data A<image data B maximum exposure period: image data A>image data B In the present embodiment, to generate the image data A for display/recording and the image data B suited to AF operations, the respective exposure conditions are set to a 2:1 cycle for the rows in the image sensor 5, and the reset/output transfer timings thereof are varied. In the present embodiment, the exposure time of the image data A for display/recording is set to $\frac{1}{30}$ second as a long side limit, and a minimum exposure time, determined by the capabilities of the image sensor 5 and so on, is set to a short side limit. The exposure amount is then set to an appropriate amount by adjusting the values of the aperture and the line amp circuit 210 and referring to a result of the AE processing carried out alongside the AF operations. On the other hand, the exposure time of the image data B that is suited to AF operations is set to $\frac{1}{60}$ second as a long side limit, and a minimum exposure time, determined by the capabilities of the image sensor 5 and so on, is set to a short side limit. The exposure amount is then set to an appropriate amount by adjusting the values of the aperture and the line amp circuit 210 and referring to a result of the AE processing carried out alongside the AF operations. Accordingly, the exposure time of the image data B for AF operations is shorter than the exposure time of the image data A for display/recording, and as a result, the readout rate of the image data B becomes twice as fast as the readout rate of the image data A.

Figure 10:
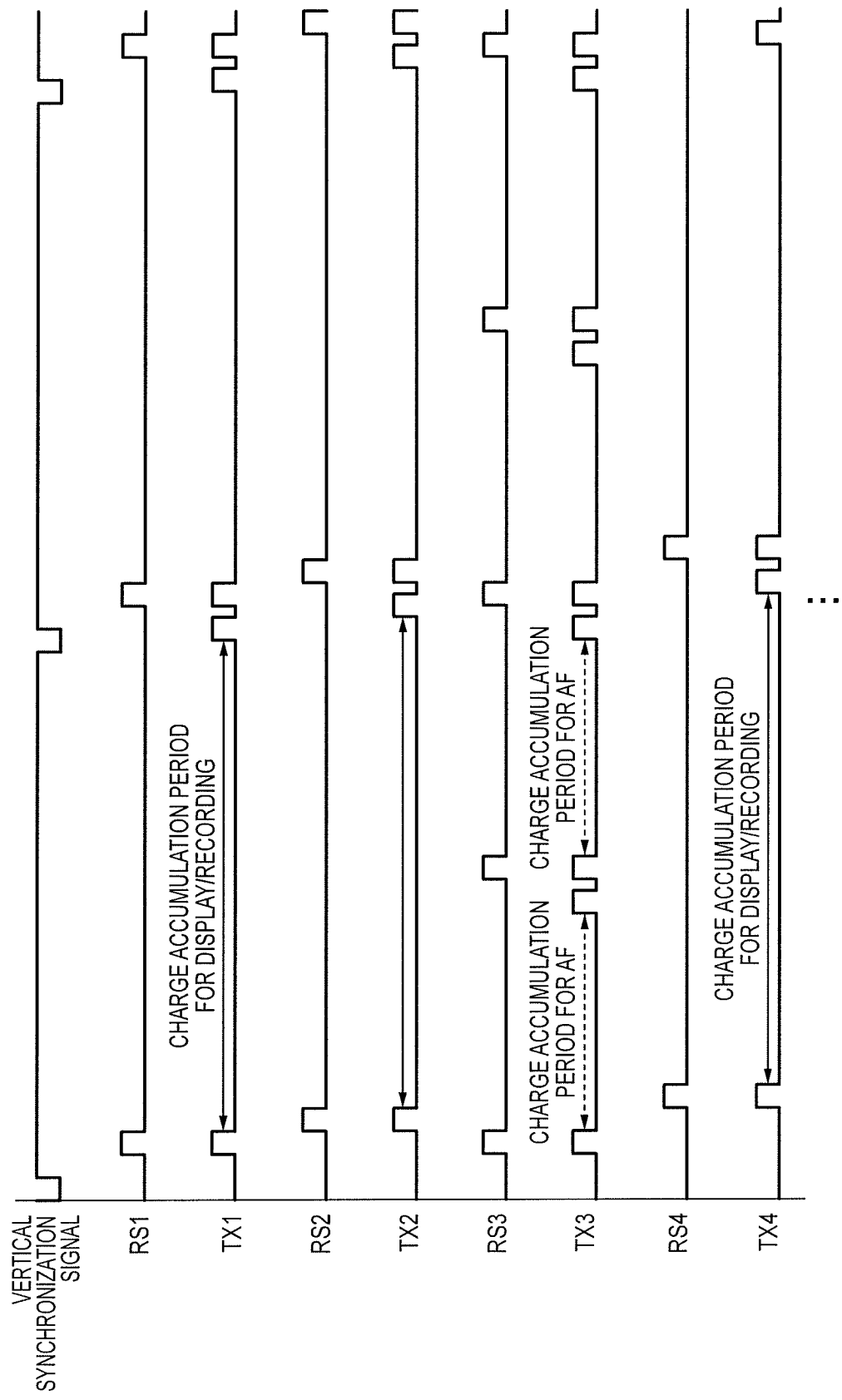
FIG. 10 is a timing chart illustrating signals output from a vertical scanning circuit when obtaining an image for display/recording and when obtaining an image for AF operations, according to the embodiment.

Once the exposure conditions (exposure time) have been set, the TX signals (TX1-4) and the RS signals (RS1-4) are controlled as indicated in FIG. 10. FIG. 10 is a timing chart illustrating signals generated by the vertical scanning circuit 206 in order to obtain the image data A for display/recording and the image data B suited to the AF operations. First, when both a TX signal and an RS signal become high, the charge in the photodiode 202 of each pixel is reset, whereas charge accumulation starts when both the TX signal and the RS signal become low. This operation is carried out sequentially according to a predetermined order under conditions set by the TG 16. Thereafter, in rows for display/recording, after a predetermined exposure time has passed, the TX1 signal, the TX2 signal, and the TX4 signal become high in sequence, the charge in the photodiode 202 is read out to the amplifier 204 and output through the horizontal scanning circuit 209, and the image data A is obtained as a result. On the other hand, in rows for AF operations, after a predetermined exposure time has passed, the TX3 signal becomes high, the charge in the photodiode 202 is read out to the amplifier 204 and output through the horizontal scanning circuit 209, and the image data B for AF operations is obtained as a result. The RS3 signal then becomes high again, and the rows for AF operation signals are reset. This operation is repeated in order to obtain the AF operation signals.

By controlling rows for display/recording and rows for AF operations in this manner, the image data A for display/recording and the image data B suited to AF operations are generated.

In the present invention, the image data A and the image data B are used in respective processes. For example, the image data A is temporarily stored in the VRAM 8. The image data A stored in the VRAM 8 is output to the D/A conversion circuit 9 and converted into an analog signal, converted into an image signal in a format suited for display, and displayed in the LCD 10 as an image. Meanwhile, the image data A stored in the VRAM 8 is also output to the compression/decompression circuit 11. After a compression process has been carried out by a compression circuit in the compression/decompression circuit 11, the data is converted into image data in a format suited to storage, and is then stored in the storage memory 12. On the other hand, during AF operations, the differences between the characteristics of the respective types of image data, mentioned earlier, are taken into consideration; the two types of image data, namely the image data A for display/recording and the image data B suited to AF operations, are taken as inputs to the AF processing circuit 14, and are used selectively by controlling the input selection circuit 37.

Accordingly, the image data for display/recording, in which a certain resolution is required, does not change from the image data A, regardless of the AF operations; however, with respect to the image data for the AF operations, the image data that is suited to the AF operations is selected and used as appropriate. The following will describe the selection of inputs to the AF processing circuit 14 during the AF operations in detail.

1. Input Selection Process for Hill-climbing Operation

Figure 11:
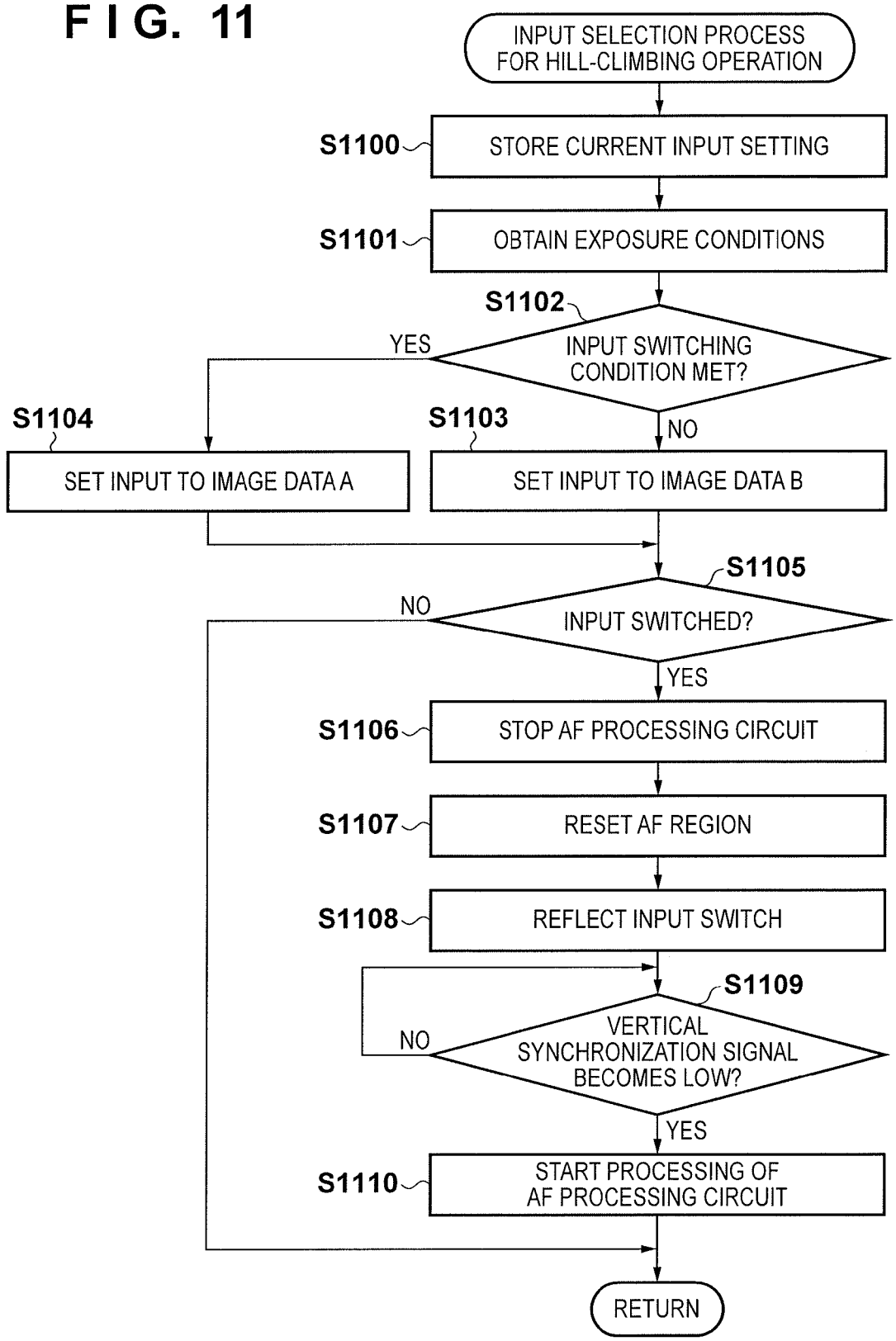
FIG. 11 is a flowchart illustrating a flow of an input selection process for hill-climbing operation according to an embodiment.

First, an input selection process for the hill-climbing operation carried out in S508 of FIG. 5 will be described in detail using the flowchart in FIG. 11. First, in S1100, a current input image data setting (the image data A or the image data B) for the AF processing circuit 14 is stored by the input selection circuit 37. Then, in S1101, the current exposure conditions are obtained.

In S1102, it is determined whether or not a condition for switching the image data input to the AF processing circuit 14 is met, based on the exposure conditions obtained in S1101. Here, the input to the AF processing circuit 14 is set to the image data B in S1103 in the case where, based on the AE evaluation value obtained by the AE processing circuit 13, the brightness of the object is higher than a set brightness. Note that this setting is reflected in S1108, which will be described later. As described earlier, the image data B has a faster readout rate than the image data A, and is thus advantageous in the case where more AF evaluation values are to be obtained in a shorter amount of time. In the present embodiment, this condition is assumed to be met in the case where a proper exposure is successfully maintained by the image data B, and in such a case, control is carried out so that the input having superior responsiveness in the AF operations is selected in the hill-climbing operation, which aims to move quickly in the direction of the in-focus position.

On the other hand, in the case where the brightness of the object is lower than the set brightness, the input to the AF processing circuit 14 is set to the image data A in S1104. Note that this setting is reflected in S1108, which will be described later. As described earlier, the image data A has a higher number of lines in the vertical direction than the image data B, and because the AF evaluation value is calculated by extracting high-frequency components using a band pass filter and carrying out cumulative addition, is advantageous from the standpoint of S/N. The image data A also has a longer maximum exposure time than the image data B, and is thus advantageous from the standpoint of exposure control. In the case where the image data B is used as the input to the AF processing circuit 14 in scenes where an appropriate exposure cannot be maintained using the image data B, it is difficult for contrast differences to arise even near the in-focus position, and there is thus a risk that the in-focus position cannot be specified. To avoid such a situation, control is carried out so that the image data A is selected as the input to the AF processing circuit 14, and an input that prioritizes stable movement toward the in-focus position over responsiveness is selected as a result.

Next, in S1105, the image data input to the AF processing circuit 14 as set through the processing from S1102 to S1104 described above is compared with the immediately-previous input image data stored in S1100, and it is determined whether or not there has been a change in the data. Here, the processing ends in the case where there is no change. However, in the case where there has been a change, the AF processing circuit 14 is stopped in S1106. In S1107, the AF region for generating the AF evaluation value is set again in accordance with the changed input image data. Next, in S1108, the input selection circuit 37 is controlled so that the image data set in S1103 or S1104 is supplied to the AF processing circuit 14.

In S1109, the system stands by for the vertical synchronization signal to become low, and when the vertical synchronization signal becomes low, in S1110, the processing of the AF processing circuit 14 starts. This is because the data generation cycles of the image data A and the image data B are different. In the case where the input is switched to a different image data, such as from the image data A to B or from the image data B to A, the operation of the AF processing circuit 14 is started at a timing that enables consistency to be maintained between the image data A and the image data B, using, as a rule, the vertical synchronization signal as a reference. Doing so makes it possible to maintain consistency when the switch is carried out. When the aforementioned processing ends, the process returns to that shown in FIG. 5.

2. Input Selection Process for Minute Driving

Next, an input selection process for the minute driving carried out in S501 of FIG. 5 will be described in detail using the flowchart in FIG. 12. First, in S1200, a current input image data setting (the image data A or the image data B) for the AF processing circuit 14 is stored by the input selection circuit 37. Then, in S1201, the current exposure conditions are obtained.

In S1202, it is determined, as a first input switching condition, whether or not a condition for switching the image data input to the AF processing circuit 14 is met, based on the exposure conditions obtained in S1201. The input switching condition used in S1202 is the same as the condition of S1102 in FIG. 11, and thus descriptions thereof will be omitted. In the case where the condition of S1202 is met, the input is set to the image data A, in the same manner as in S1104 of FIG. 11. On the other hand, in the case where the condition of S1202 is not met, the process moves to S1203, where the focus state level at that point in time is obtained from the AF processing circuit 14.

Next, in S1205, it is determined whether a second input switching condition has been met. The second input switching condition corresponds to a switch based on the focus state level obtained in S1203. First, in the case where the focus state level is less than or equal to the focus state level a indicated in FIG. 9B, or in other words, in the case where the current focus lens position is in the regions B and C in FIG. 9A, the input is set to the image data B in S1206. In this case, it is highly likely that the scene is not in focus and it is necessary to quickly track to the vicinity of the in-focus position, and thus the image data B, which prioritizes responsiveness, is selected.

On the other hand, in the case where the focus state level is greater than the focus state level α indicated in FIG. 9B in S1205, or in other words, in the case where the current focus lens position is in the region A in FIG. 9A, the input is set to the image data A in S1207. In this case, the focus lens position has closed in on the vicinity of the in-focus position, and thus the image data A, which is more advantageous in terms of S/N and accuracy than responsiveness, is selected, in order to achieve an accurate in-focus position in the region A in FIG. 9A.

Next, in S1208, the image data input to the AF processing circuit 14 selected through the processing from S1202 to S1207 described above is compared with the immediately-previous input image data stored in S1200, and it is determined whether or not there has been a change in the data. Here, the processing ends in the case where there is no change. However, in the case where there has been a change, the AF processing circuit 14 is stopped in S1209. In S1210, the AF region for generating the AF evaluation value is set again in accordance with the changed input image data. Next, in S1211, the input selection circuit 37 is controlled so that the image data set in S1204, S1206, or S1207 is supplied to the AF processing circuit 14.

In S1212, the system stands by for the vertical synchronization signal to become low, and when the vertical synchronization signal becomes low, in S1213, the processing of the AF processing circuit 14 starts. The reason for carrying out such control is the same as that described with reference to S1109 and S1110. When the aforementioned processing ends, the process returns to that shown in FIG. 5.

Figure 13A:
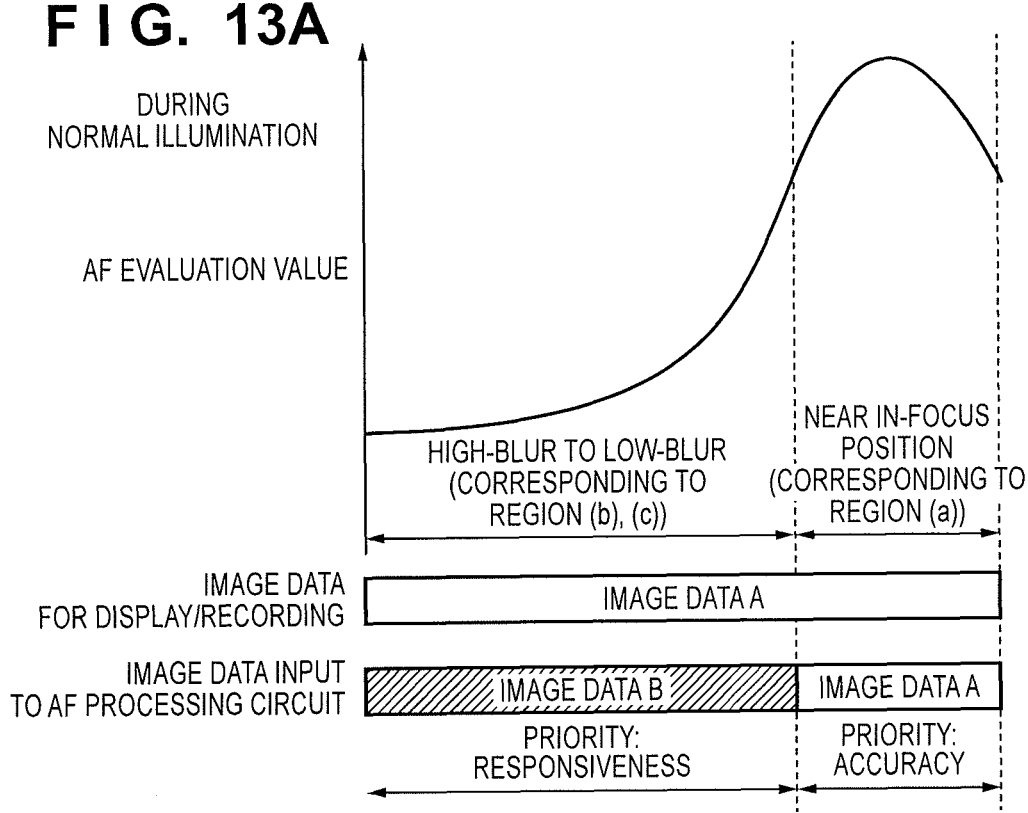
FIGS. 13A and 13B illustrate a relationship between changes in an AF evaluation value, image data for display/recording, and image data input into an AF processing circuit, according to the first embodiment.

As described thus far, in the AF operations according to the first embodiment, the image data used in the AF operations, or in other words, the image data input to the AF processing circuit 14, is switched depending on the focus state level, the exposure conditions, and so on. As a result, both responsiveness and accuracy can be achieved when bringing a scene into focus, and there is no influence on the image displayed in the LCD 10, on the image data for recording as a moving picture. Accordingly, by applying the present first embodiment, the image data B, which prioritizes responsiveness, is used as the input to the AF processing circuit 14 in order to quickly track to the in-focus position in a region spanning from high-blur to low-blur if a scene is under a normal amount of lighting, as shown in FIG. 13A. On the other hand, the image data A, which prioritizes focal accuracy and is advantageous in terms of S/N and accuracy, is used as the input to the AF processing circuit 14 near the in-focus position. It is furthermore possible to always use the image data A for display/recording.

Figure 13B:
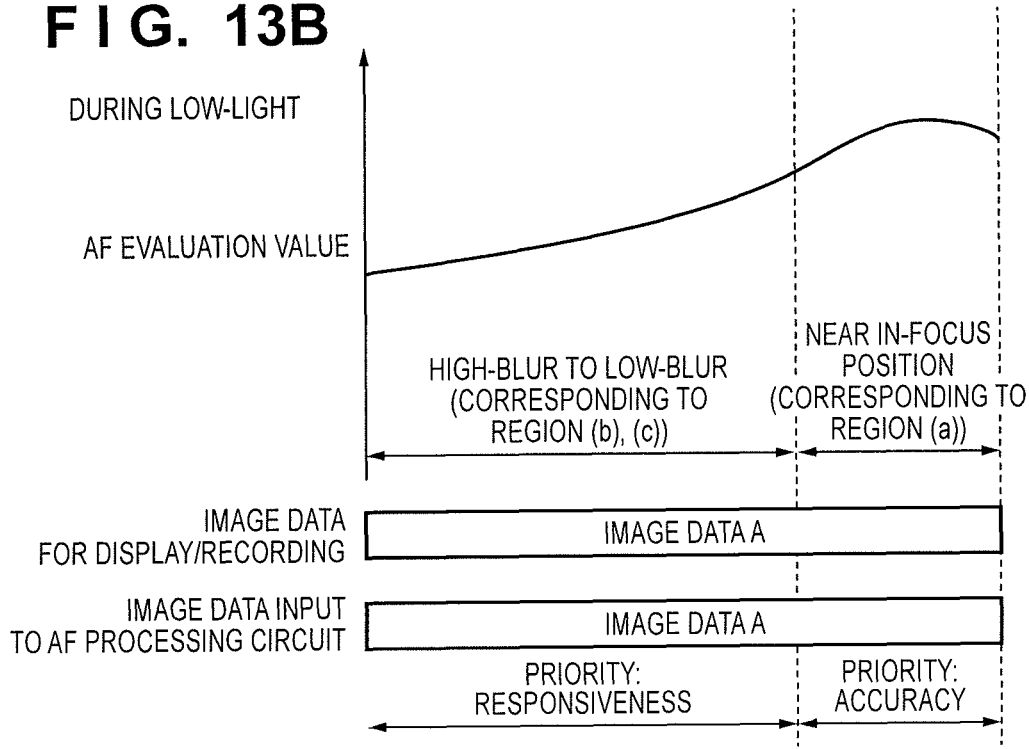

Meanwhile, in low-light scenes such as that indicated in FIG. 13B, the image data B, which is suited to AF operations that prioritize responsiveness, cannot ensure a sufficient exposure time, making it difficult to achieve a contrast difference for the object. Assuming such a situation, the image data A, which is advantageous for both AF operations and display/recording from the standpoint of S/N, is used with priority in low-light scenes, regardless of the focus state level.

As described above, the image data for display in which a predetermined resolution is required to ensure a set level of visibility, and image data for recording in which a recording resolution specified by the format in which the moving picture is recorded is required is generated independently from the image data used in AF operations. Furthermore, in order to ensure a quick response to the in-focus position and focus accuracy during the AF operations, a plurality of types of image data, as mentioned earlier, are used separately based on the state of focus, the scene in which the AF operations are carried out, and so on. Because switching the image data used in the AF operations does not affect the image for display/recording, the quality of the image for display/recording can be maintained.

Second Embodiment

Next, a second embodiment of the present invention will be described. With respect to the input selection process, the aforementioned first embodiment describes an example in which the image data used in the AF operations is determined based on the exposure conditions and the focus state level; however, the conditions for selecting the input image data are not limited thereto. The second embodiment describes an example of other selection conditions used in the input selection process. Note that the configuration of the image capturing apparatus 1 and the processes aside from the input selection process for minute driving operations are the same as those described in the first embodiment, and thus descriptions thereof will be omitted. The second embodiment describes an example in which other selection conditions are incorporated into the input selection process for minute driving.

1. Input Selection Process Including Object Distance

Figure 12:
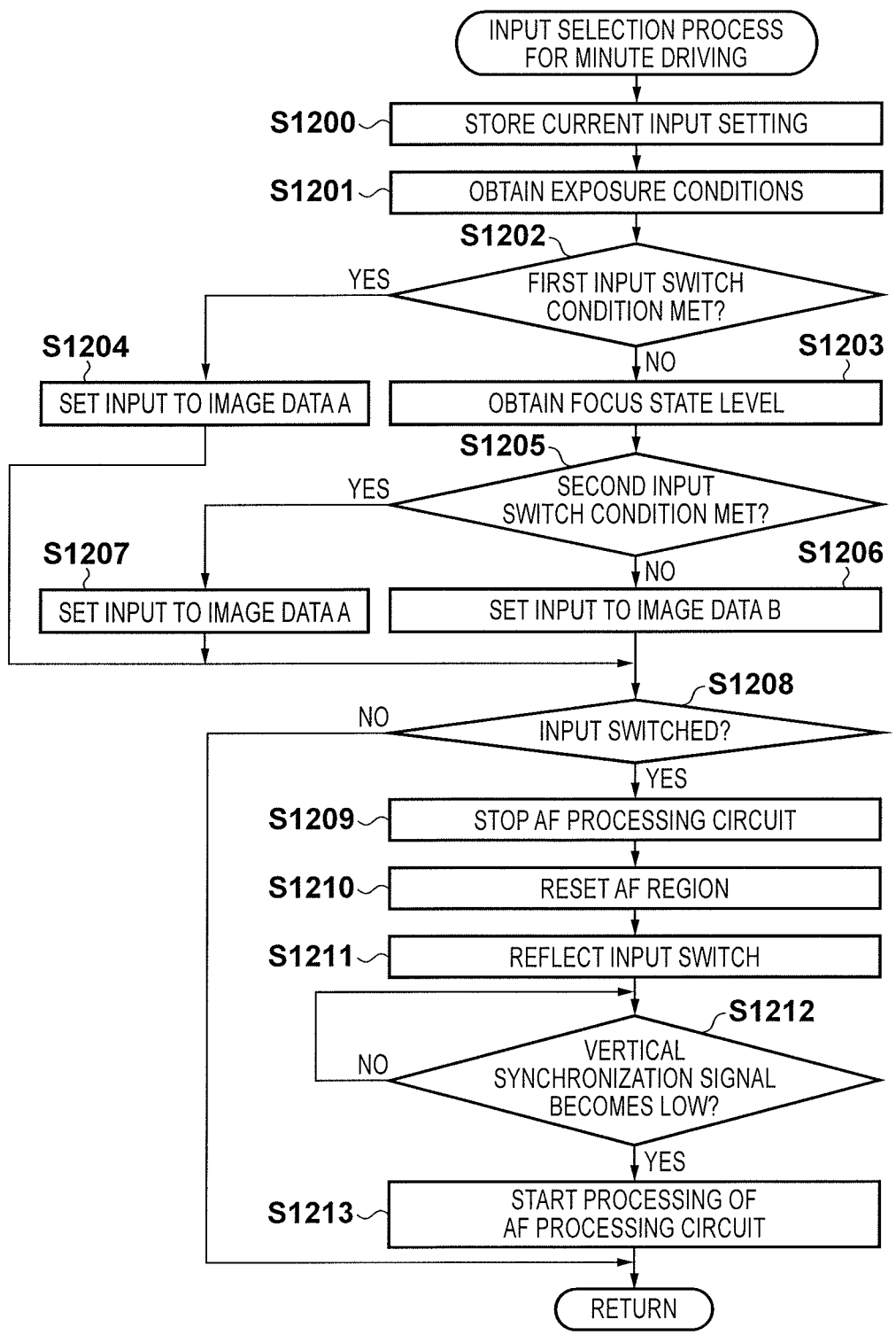
FIG. 12 is a flowchart illustrating a flow of an input selection process for minute driving operations according to first and second embodiments.

An example in which the conditions for selecting the input based on the focus state level, carried out from S1203 to S1207 in FIG. 12, are extended by also taking into consideration the distance of the object, will be described next. Specifically, in a configuration in which a distance range to be measured during AF operations (called a "distance measurement range" hereinafter) can be switched, as shown in FIGS. 14A and 14B, the conditions for selecting the image data input to the AF processing circuit 14 are switched by also taking into consideration the settings of the distance measurement range.

The second embodiment assumes a case in which the following three settings can be made. These settings are a distant scene setting, for executing AF operations efficiently on distant objects; a macro setting, for executing AF operations efficiently on closer objects; and a normal setting, for executing AF operations efficiently on objects across a majority of typical scenes. FIG. 14B indicates a relationship between the three distance measurement ranges and the scan range of the focus lens group 3. The breadth of the scan range is assumed to be set so that the relationship macro>normal>distant holds true, and FIG. 14A indicates how the conditions for selecting the image input to the AF processing circuit 14 change in light of this relationship.

FIG. 14A is a chart illustrating the input image data selected based on combinations of focus state levels and distance measurement ranges, and the input image data is determined based on the two elements, namely the focus state level and the distance measurement range. A threshold is set for the focus state level so that the image data B, which prioritizes responsiveness, is used more frequently as the scan range broadens, such as with the macro setting. On the other hand, the threshold is set for the focus state level so that the image data A, which prioritizes the focus accuracy over responsiveness, is used more frequently as the scan range narrows, such as with the distant scene setting. With the normal setting, which is located between the macro and distant scene settings, the threshold for the focus state level is set to an intermediate value between the two aforementioned thresholds. In this manner, the focus state level threshold at which the image data B is selected is increased as the scan range broadens.

It is then determined whether or not any of the following three conditions apply as the second switch condition in S1205 of FIG. 12. These conditions are that the focus state level obtained in S1203 is greater than α and the distance measurement range corresponds to macro, that the focus state level is greater than β and the distance measurement range is normal, and that the focus state level is greater than γ and the distance measurement range is distant. The image data A is set in the case where the second switch condition is met, and the image data B is set in the case where the second switch condition is not met.

By selecting the image data input to the AF processing circuit 14 based on a combination of the distance measurement range and the focus state level in this manner, the quality of the image for display/recording can be maintained, a quick response to the in-focus position and the focus accuracy can be ensured, and furthermore, the AF operations can be carried out more efficiently. Through this, the frequency at which the in-focus position is closed in on can be increased.

Meanwhile, although the second embodiment focuses on switching the distance measurement range settings, if the configuration enables the scan range itself to be specified in advance, it is considerable for the breadth of the scan range, rather than the distance measurement range setting, to be used as the condition for switching the image data that is input.

2. Input Selection Process Including Focal Length

Next, an example in which the conditions for selecting the input based on the focus state level, carried out from S1203 to S1207 in FIG. 12, are extended by also taking into consideration the focal length, will be described. Specifically, in a configuration in which the focal length can be changed during AF operations, as shown in FIGS. 15A and 15B, the conditions for selecting the image data input to the AF processing circuit 14 are switched by also taking into consideration changes in the scan range of the focus lens group 3 produced by differences in the focal length.

The second embodiment describes an example in which the zoom lens group 2 can be stopped at three focal lengths, namely Tele, on the telephoto side, Middle, in the middle, and Wide, on the wide-angle side. FIG. 15B illustrates relationships between the stopping positions of the zoom lens group 2 and the scan range of the focus lens group 3. If the scan ranges of the focus lens group 3 when the zoom lens group 2 is on the telephoto side, in the middle, and on the wide-angle side are taken as a movable range $R_T$, a movable range $R_M$, and a movable range $R_W$, respectively, the ranges are set so that the relationship movable range $R_T$>movable range $R_M$>movable range $R_W$ holds true; FIG. 15A indicates how the conditions for selecting the image input to the AF processing circuit 14 change assuming this relationship.

Figures 15A, 15B:
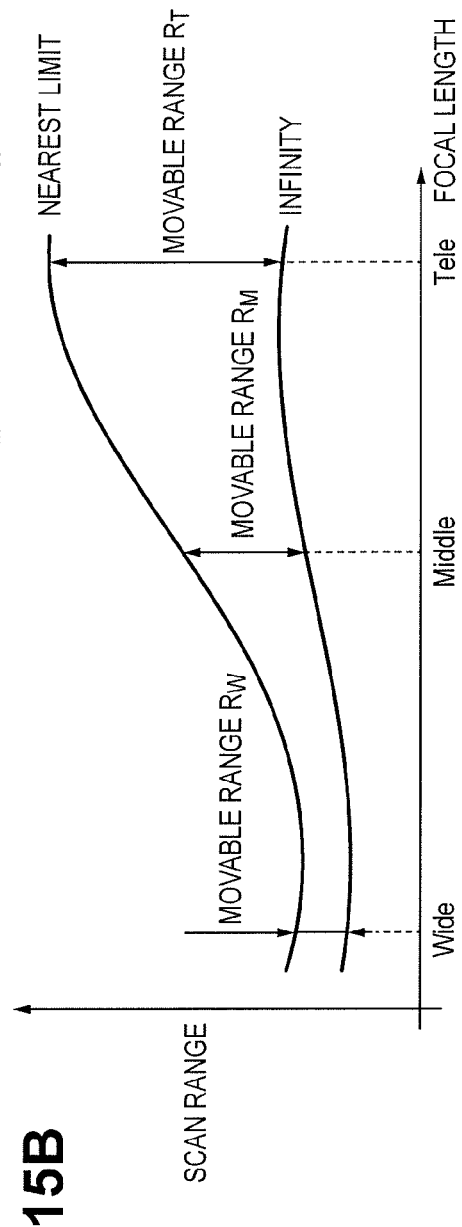
FIGS. 15A and 15B are diagrams illustrating a relationship between a focal length and a focus state level, and image data input into an AF processing circuit, according to the second embodiment.

FIG. 15A is a chart illustrating the input image data selected based on combinations of focus state levels and focal lengths, and the input image data is determined based on the two elements, namely the focus state level and the focal lengths. A threshold is set for the focus state level so that the image data B, which prioritizes responsiveness, is used more frequently as the scan range broadens, such as on the telephoto side Tele. On the other hand, the threshold is set for the focus state level so that the image data A, which prioritizes the focus accuracy over responsiveness, is used more frequently as the scan range of the focus lens group 3 narrows, such as on the wide-angle side Wide. With Middle, which is located between Tele and Wide, the threshold for the focus state level is set to an intermediate value between the two aforementioned thresholds. In this manner, the focus state level threshold at which the image data B is selected is increased as the scan range broadens.

It is then determined whether or not any of the following three conditions apply as the second switch condition in S1205 of FIG. 12. These conditions are that the focus state level obtained in S1203 is greater than α and the focal length is Tele, the focus state level is greater than β and the focal length is Middle, and the focus state level is greater than γ and the focal length is Wide. The image data A is set in the case where the second switch condition is met, and the image data B is set in the case where the second switch condition is not met.

By selecting the image data input to the AF processing circuit 14 based on a combination of the focal length and the focus state level in this manner, the quality of the image for display/recording can be maintained, a quick response to the in-focus position and the focus accuracy can be ensured, and furthermore, the AF operations can be carried out more efficiently. Through this, the frequency at which the in-focus position is closed in on can be increased.

3. Input Selection Process Including Object

Next, an example in which the conditions for selecting the input based on the focus state level, carried out from S1203 to S1207 in FIG. 12, are extended by also taking into consideration the object, will be described next. Specifically, as shown in FIGS. 16A and 16B, the conditions for selecting the image data input to the AF processing circuit 14 are switched in accordance with an AF region setting in order to reflect differences in the object in the AF operations.

The second embodiment describes an example of a case in which a default AF region of a preset size is set in the center of the screen, a case where the AF region is set to a region corresponding to a face detected by the face detection circuit 36, and a case where the AF region is set to a desired position in the screen through operations using a touch panel, operational members, and the like. FIG. 16B illustrates examples of the default AF region, the face AF region, and the AF region set by user selection, respectively.

Figures 16A, 16B:
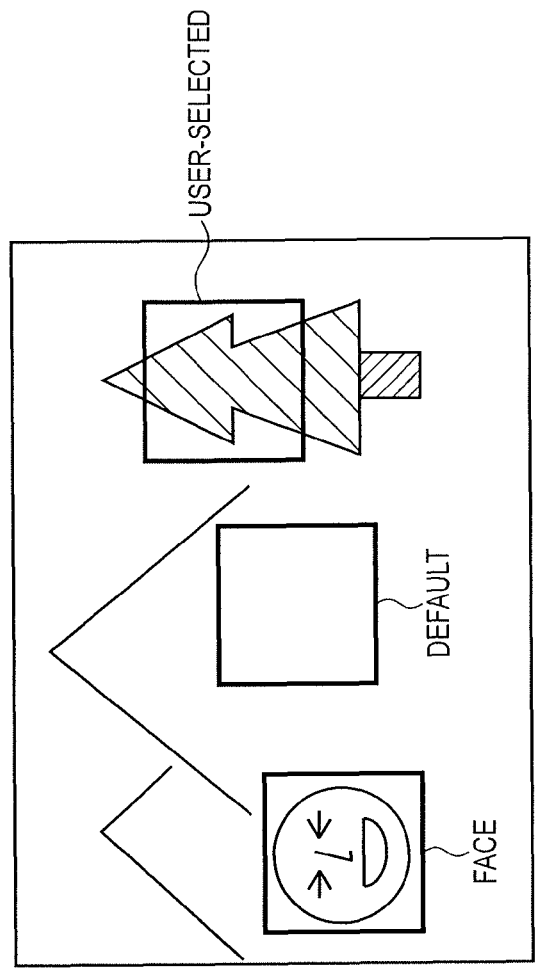
FIGS. 16A and 16B are diagrams illustrating a relationship between an object and a focus state level, and image data input into an AF processing circuit, according to the second embodiment.

FIG. 16A is a chart illustrating the input image data selected based on combinations of focus state levels and the set AF regions, and the input image data is determined based on the two elements, namely the focus state level and the AF regions. First, in the case where the default AF region is set in the center of the screen and the focus state level is less than or equal to β, the image data B is selected as the image data input to the AF processing circuit 14, whereas the image data A is selected in the case where the focus state level is greater than β. On the other hand, in the case where the AF region is set to the detected face and the focus state level is less than or equal to α, the image data B is selected as the image data input to the AF processing circuit 14, whereas the image data A is selected in the case where the focus state level is greater than α. Note that in the present embodiment, the case where the AF region is set through user selection uses the same basis as the case where the AF region is set to the face.

In other words, it is then determined whether or not any of the following two conditions apply as the second switch condition in S1205 of FIG. 12. These conditions are that the focus state level obtained in S1203 is greater than α and the AF region that has been set is the default AF region, and that the focus state level is greater than β and the AF region that has been set is the face AF region or the user-selected AF region. The image data A is set in the case where the second switch condition is met, and the image data B is set in the case where the second switch condition is not met.

In this manner, the threshold is set so as to prioritize responsiveness to a greater extent than with the default selection conditions in the case where the AF region has been set to an object having a high priority by some kind of detection unit, the case where clear intent is displayed on the part of a user, as with user selection, and so on.

By selecting the image data input to the AF processing circuit 14 based on a combination of the AF region and the focus state level in this manner, the quality of the image for display/recording can be maintained, a quick response to the in-focus position and the focus accuracy can be ensured, and furthermore, the AF operations can be carried out more efficiently. Through this, the frequency at which the in-focus position is closed in on can be increased.

According to the second embodiment as described above, the conditions used when selecting the image data are subdivided based on the state of the camera, the settings thereof, and so on, which makes it possible to carry out the AF operations more efficiently, while also achieving the same effects as those in the first embodiment.

Third Embodiment

The aforementioned first and second embodiments primarily describe examples in which display/recording are balanced in scenes in which movement in the image capturing apparatus 1 or the object is stable. However, when shooting still images, moving pictures, or the like, the scene will not necessarily always be stable. For example, a case where a user tracks a moving object and shoots that objects so that the object is shot at a correct angle of view, a case where the image capturing apparatus 1 is stable but an object is moving, or the like can be considered. In such a case, it is desirable to carry out highly-responsive AF operations in accordance with the continuously changing object.

Accordingly, applying the present invention in such a case, where the image capturing apparatus 1 or the object is not in a stable state, makes it possible to carry out the AF operations efficiently based on that scene while also maintaining the quality of the display/recording. The following describes an example in which the present invention is applied. Note that in the third embodiment, the configuration of the image capturing apparatus 1 and the processes aside from the input selection process are the same as those described in the first embodiment, and thus descriptions thereof will be omitted.

1. Input Selection Process Based on Stability Level of Image Capturing Apparatus The shake detection sensor 35 and the shake detection circuit 34 shown in FIG. 1 can be used as a unit for determining a stability level of the image capturing apparatus 1. Angular velocity information in the pitch direction and the yaw direction (called "gyro information" hereinafter) can be obtained from the shake detection circuit 34, and the state in which the image capturing apparatus 1 is placed can be determined based on this information.

Figure 17:
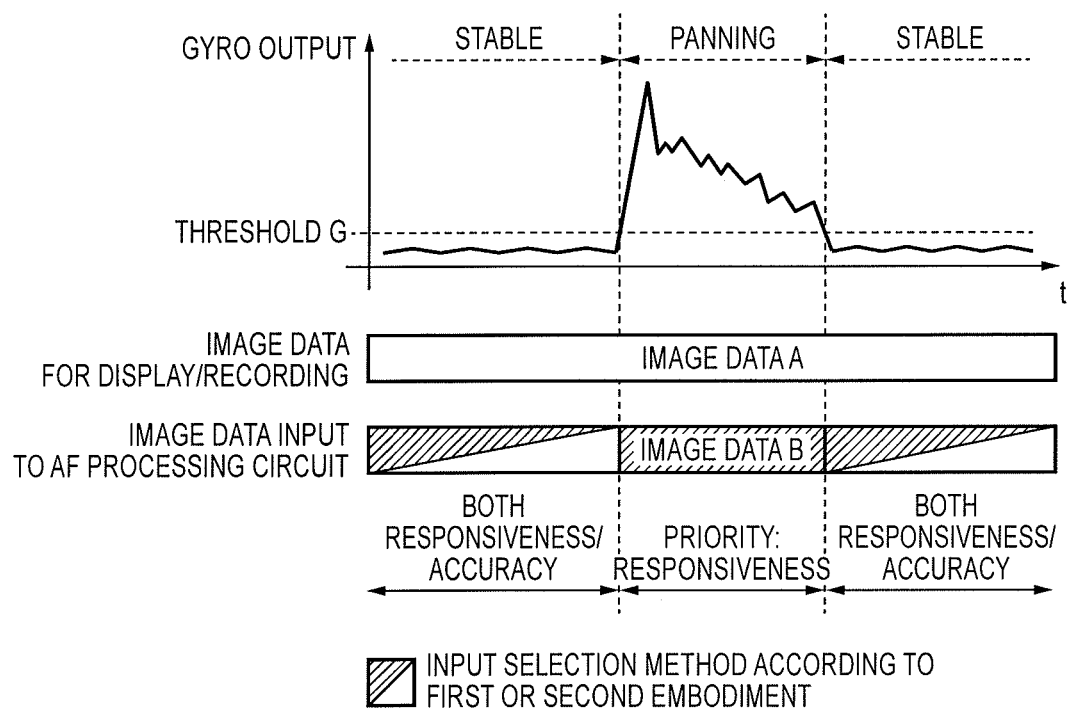
FIG. 17 is a diagram illustrating a relationship between a Gyro output, image data for display/recording, and image data input into an AF processing circuit, according to a third embodiment.

FIG. 17 illustrates a relationship between the image data for display/recording, and the image data input to the AF processing circuit and the gyro information. For example, if, of the gyro information, the absolute value of the yaw direction angular velocity information is calculated, a change such as that shown in the upper section of FIG. 17 occurs during panning in the yaw direction when in a stable state. A threshold for detecting changes, such as a threshold G in FIG. 17, is set, and an unstable state is determined in the case where the gyro information is greater than the threshold, whereas a stable state is determined in the case where the gyro information is less than or equal to the threshold. The same applies to the pitch direction. A method that determines the two states, namely stable/unstable, by adding all of the angular velocity information regardless of pitch or yaw direction and calculating the absolute value thereof can also be considered. By using the gyro information in this manner, the input selection process indicated in the first and second embodiments can be executed when the camera is in a stable state, whereas the image data B, which prioritizes responsiveness and is suited to AF operations, can be used when the camera is in an unstable state.

Figure 19:
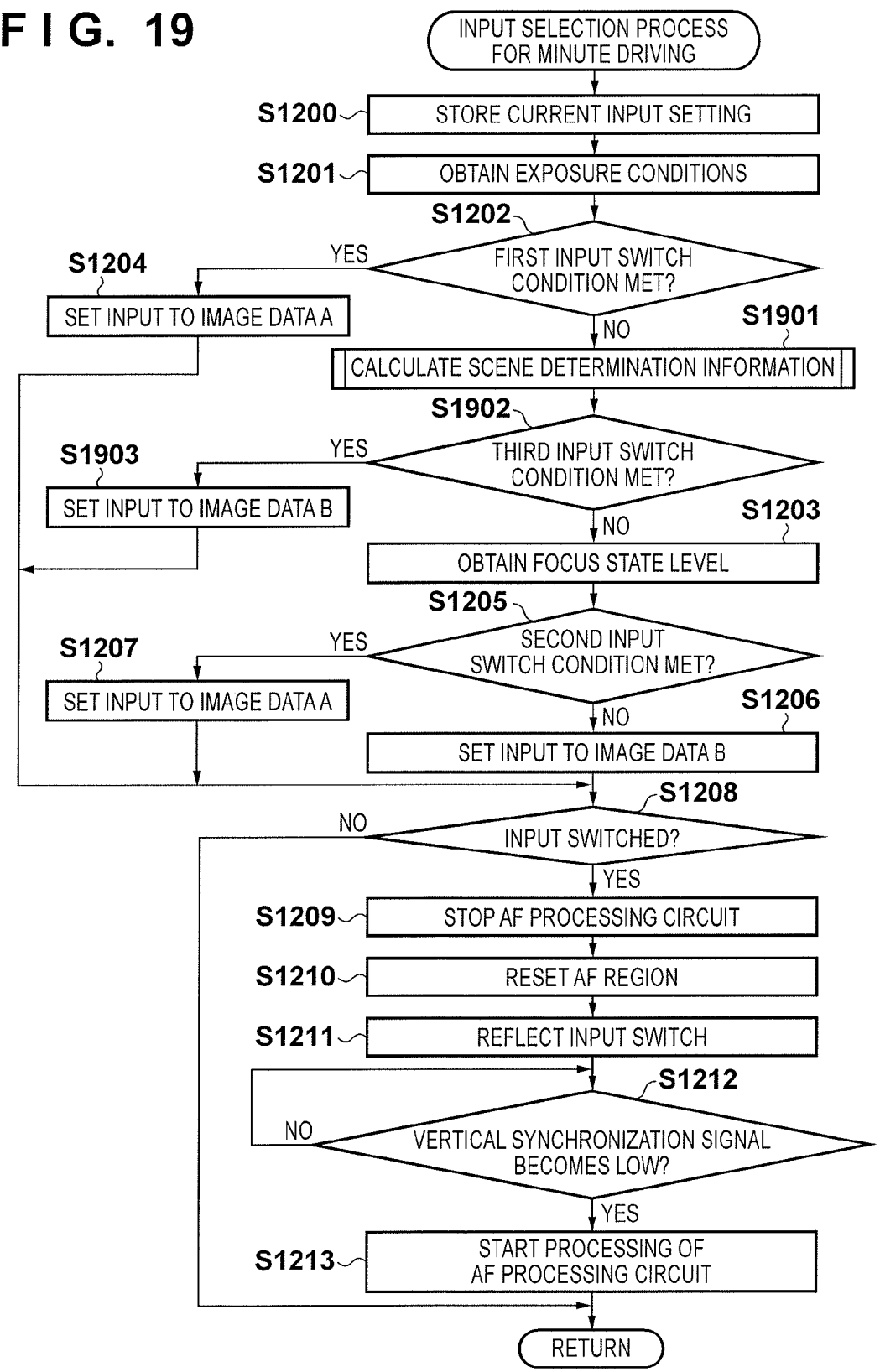
FIG. 19 is a flowchart illustrating a flow of an input selection process for minute driving operations according to the third embodiment.

FIG. 19 is a flowchart illustrating an input selection process for minute driving according to the third embodiment. Note that processes that are the same as those illustrated in FIG. 12 are given the same reference numerals, and descriptions thereof are omitted as appropriate.

In S1202, it is determined whether or not the first input switching condition for switching the image data input to the AF processing circuit 14 is met, based on the exposure conditions obtained in S1201. Here, it is determined whether the brightness of the object is lower than a set brightness based on the AE evaluation value obtained by the AE processing circuit 13. The process moves to S1901 in the case where the first input switching condition is not met.

In S1901, scene determination information is calculated. This corresponds to determining a stable/unstable state based on the gyro information, as described above. In S1902, it is determined, based on the result of S1901, whether or not a third input switching condition has been met. In the case where it is determined in S1902 that the state is unstable, the process moves to S1903, where the input selection circuit 37 is controlled so that the image data B, which prioritizes the responsiveness of the AF operations, is set to the input to the AF processing circuit 14. On the other hand, the process moves to S1203 in the case where it is determined in S1902 that the scene is stable. Accordingly, the processing described in the first embodiment or the second embodiment is carried out in the case where it has been determined that the scene is stable.

In this manner, the image data suited to AF operations can be selected in a timely manner based on the exposure conditions, the focus state level, and the result of determining the stability level of the camera. On the other hand, because the image data for display/recording can be set independently from the image data used for AF operations, there will be no drop in the quality of images for display/recording.

2. Input Selection Process Based on Stability Level of Object

The face detection circuit 36 shown in FIG. 1 can be used as a unit for determining a stability level of the object. Facial detection information, such as the position, size, and so on of a face in the screen, can be obtained from the face detection circuit 36, and a state of change in the object, and particularly in the face, can be determined based on this information.

Figure 18A:
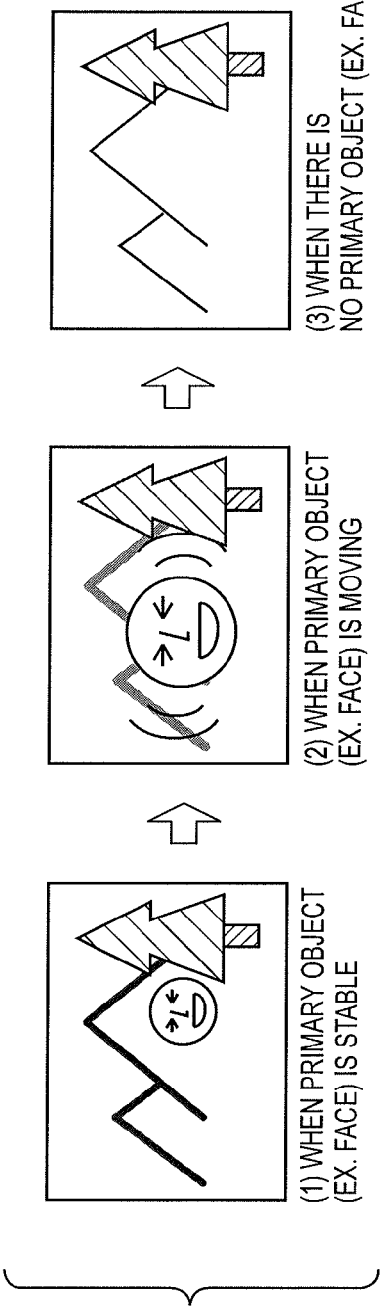
FIGS. 18A and 18B are diagrams illustrating a relationship between a change amount in detected facial information, image data for display/recording, and image data input into an AF processing circuit, according to the third embodiment.
Figure 18B:
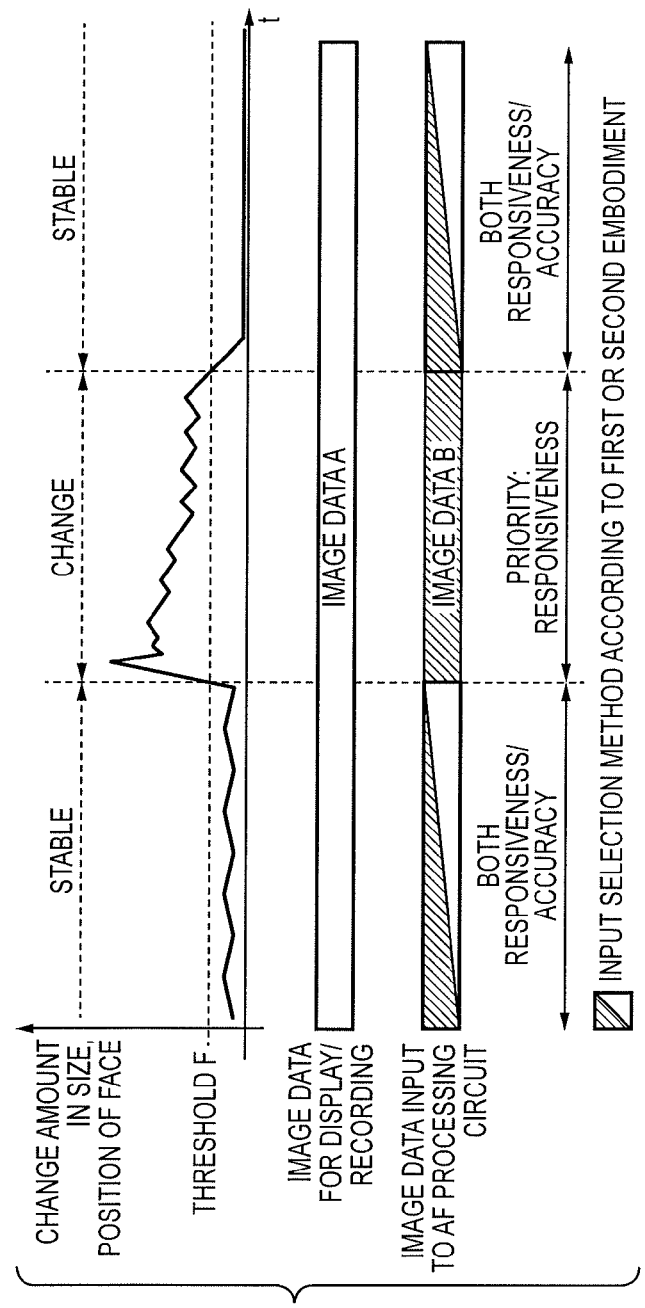

FIGS. 18A and 18B show a relationship between the image data for display/recording, and the image data input to the AF processing circuit and a change in the state of the detected face. FIG. 18A illustrates a change in a face, which serves as the object, in order from (1) to (3). Specifically, (1) illustrates a case where neither the detected position nor the detected size of the face has changed. (2), meanwhile, illustrates a case where both the position and the size of the face have changed due to the face approaching the camera. (3) illustrates a case where the face has disappeared from the screen.

FIG. 18B indicates a relationship between a change amount of the detected face, the image data for display/recording, and the image data input to the AF processing circuit. A method in which the change amount of the face is calculated based on the result of calculating differences between the positions and the sizes of the detected face between predetermined frames, for example, can be considered. By setting a threshold for detecting a change, such as a threshold F in FIG. 18B, a state in which the object is stable and the state in which the object changes can be determined. Note that the change amount may be calculated using only the size of the detected face or the position of the detected face, or using both the size and the position of the detected face. Meanwhile, although the facial detection result will be stable in the case where the object is continuously facing toward the camera, the face may cease to be detected in the case where the object is facing sideways, turns around, or the like. Accordingly, the configuration may be such that the stability level and change state of the object is determined based on the frequency of detections and non-detections.

By using the facial detection information in this manner, the input selection process described in the aforementioned first and second embodiments can be carried out in the case where the object is in a stable state, whereas in the case where the object is changing, the image data B, which prioritizes responsiveness and is suited to AF operations, can be used.

The processing in the flowchart illustrated in the aforementioned FIG. 19 can also be applied in the input selection process that is based on the stability level of the object; the third input switching condition indicated in S1901 can be realized by using the aforementioned facial detection result. In this manner, the image data suited to AF operations can be selected in a timely manner based on the exposure conditions, the focus state level, and the result of determining the stability level of the object.

On the other hand, because the image data for display/recording can be set independently from the image data used for AF operations, there will be no drop in the quality of images for display/recording.

Modifications

This modification describes an example in which the framerate of the image data B is varied in accordance with a change.

Figure 20A:
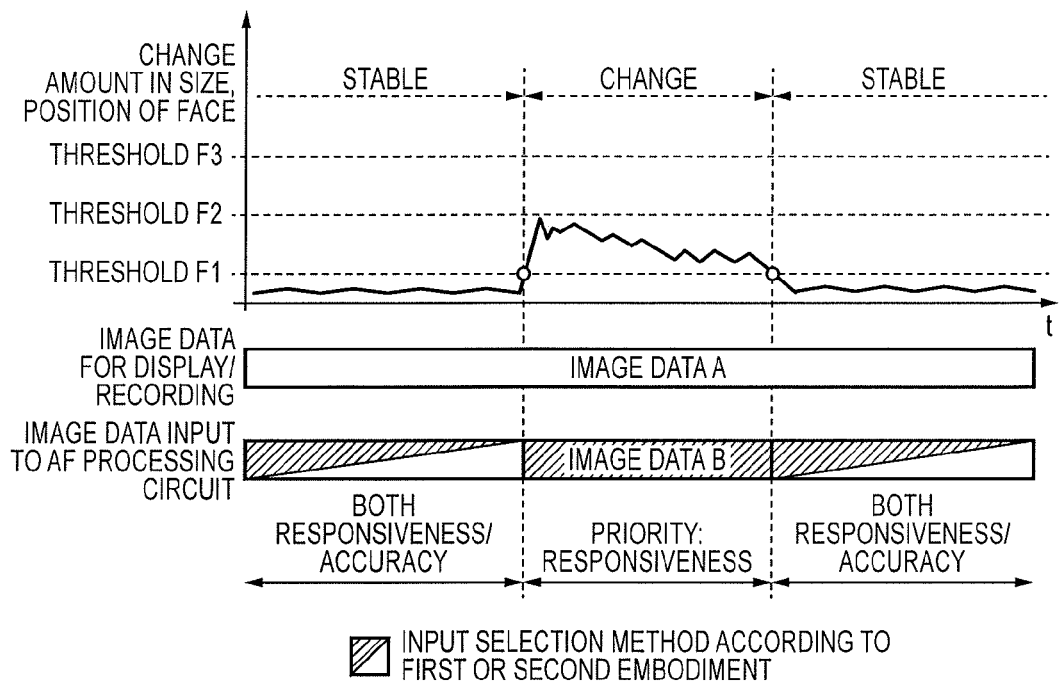
FIGS. 20A to 20C are diagrams illustrating a relationship between image data for display/recording and image data input into an AF processing circuit in accordance with a change amount in detected facial information, according to a variation of the third embodiment.
Figure 20B:
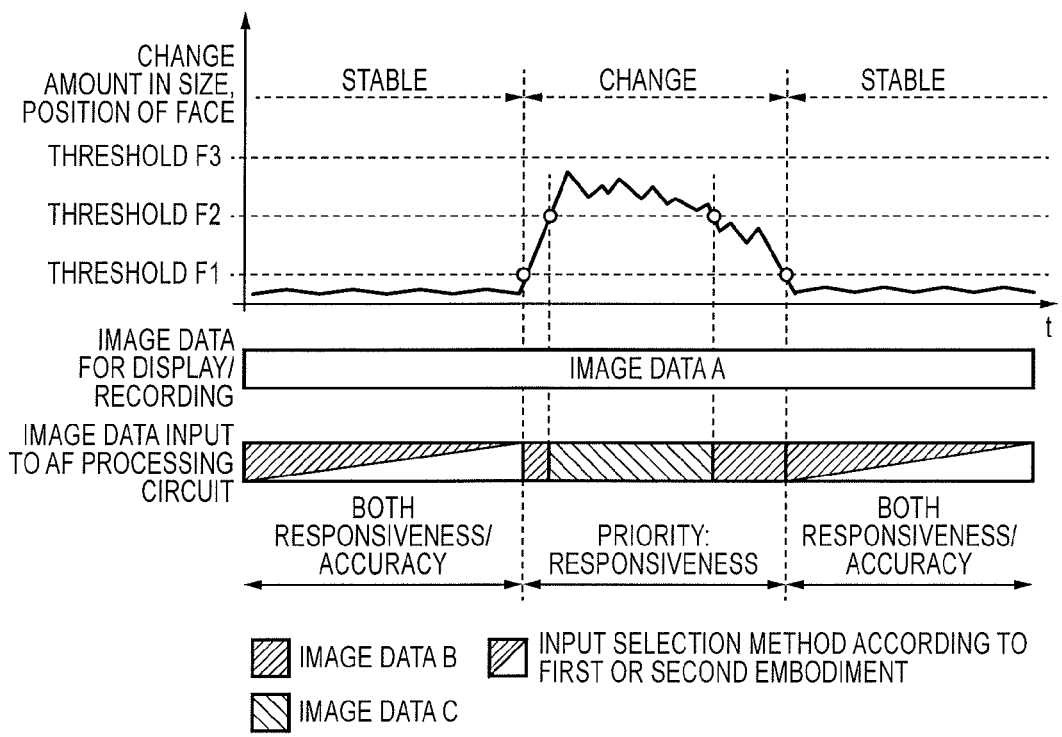
Figure 20C:
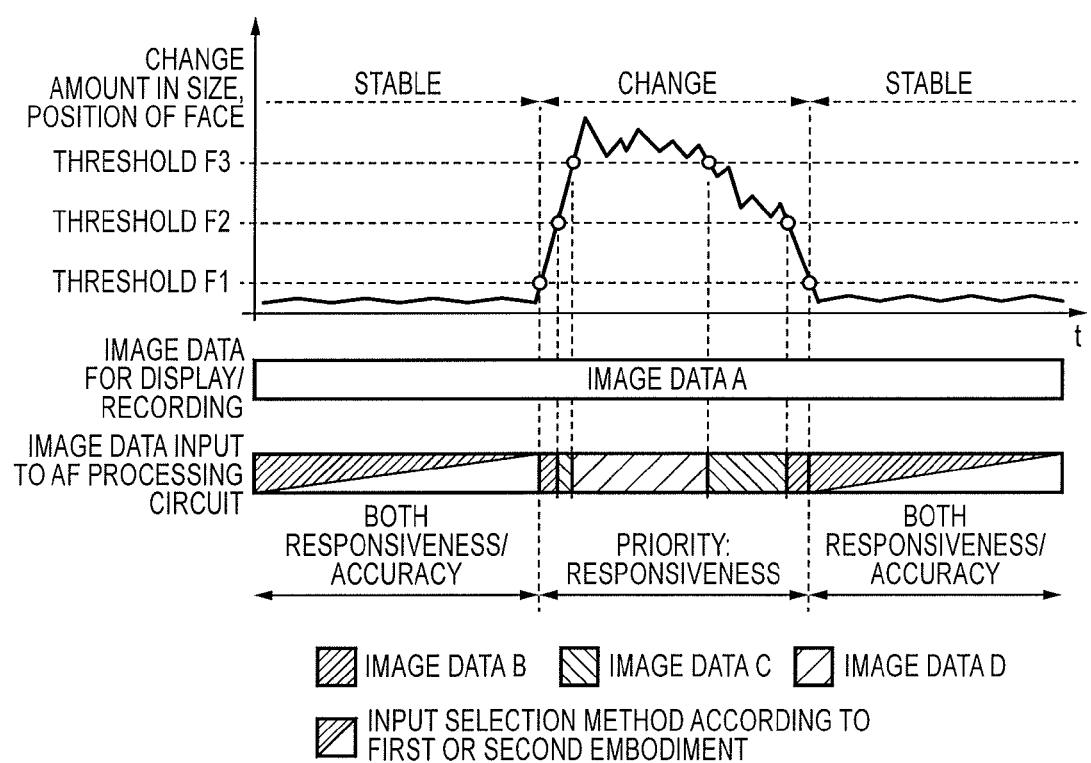

The third embodiment describes an example in which a change amount is calculated using gyro information and facial detection information, and the stability or instability of the camera and the object is then determined. Determining the stability/instability is carried out by setting predetermined thresholds, such as the thresholds G and F, and then determining the two states based thereon; however, the present invention is not limited to this method. A method in which the image data input to the AF processing circuit 14 is further switched in accordance with a level of the change amount, as indicated in FIGS. 20A to 20C, can also be considered. Specifically, although the image data B, which prioritizes responsiveness, is limited to ⅟60 second on the long side in the first embodiment, a configuration in which image data C and image data D, in which this limit is even shorter, are prepared and set as the input to the AF processing circuit 14 is also possible. In this case, the framerate increases in order from the image data B, to the image data C, to the image data D, and the responsiveness during AF operations improves as a result.

For example, in the case where the change amount fluctuates between thresholds F1 and F2 as indicated in FIG. 20A, the image data B is selected as the image data input to the AF processing circuit 14. FIG. 20B illustrates an example of a case where the change is greater than that shown in FIG. 20A. In this case, the change amount fluctuates between the thresholds F1 and F2 and between thresholds F2 and F3. In this case, the image data B is selected as the image data input to the AF processing circuit 14 in the case where the change amount fluctuates between the thresholds F1 and F2, whereas the image data C is selected as the image data input to the AF processing circuit 14 in the case where the change amount fluctuates between the thresholds F2 and F3. FIG. 20C illustrates an example of a case where the change is greater than that shown in FIG. 20B. In addition to the cases illustrated in FIG. 20B, the image data D is selected as the image data input to the AF processing circuit 14 in the case where the change amount fluctuates greater than the threshold F3.

In other words, the AF operations are executed efficiently by subdividing the thresholds for specifying states relative to change amounts and selecting the image data to be used in the AF operations in a timely manner based on those change amounts. In other words, the responsiveness can be improved by selecting image data having a higher framerate as the change amount increases.

In this manner, the image data suited to AF operations can be selected in a timely manner based on the exposure conditions, the focus state level, and by controlling the framerate in accordance with the result of determining the stability level of the object and the degree of the stability level. On the other hand, because the image data for display/recording can be set independently from the image data used for AF operations, there will be no drop in the quality of images for display/recording.

Although the foregoing has described preferred embodiments of the present invention, the present invention is not intended to be limited to the specific embodiments, and all variations that do not depart from the essential spirit of the invention are intended to be included in the scope of the present invention.

For example, although the foregoing embodiments describe examples in which the input selection circuit 37 is controlled and the image data A and B are used exclusively as inputs for a single AF processing circuit 14, the present invention is not limited thereto. As another variation, for example, an AF processing circuit 14 may be prepared for both the image data A and the image data B, and rather than switching the input using the input selection circuit 37, AF evaluation values may be generated for both pieces of image data, and may then be used as appropriate when the CPU 15 performs calculations for specifying the in-focus position. In this case, for example, in the case where it is clear that only one of the outputs will be used, such as in the low-light state described in the first embodiment, the supply of power to the AF processing circuit for the data that will not be used can be stopped, which makes it possible to reduce the amount of power that is consumed. Meanwhile, because a plurality of outputs can be obtained simultaneously, a method in which, for example, variations in changes in the output of the image data A and B are used to detect the in-focus position in the case where conditions are such that both outputs can be used near the in-focus position can also be considered. In this manner, some of the aforementioned embodiments can be combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-216752 and 2013-216753, both filed on Oct. 17, 2013 which are hereby incorporated by reference herein in their entirety.

What is claimed is:

1. An image capturing apparatus comprising:
at least one non-transitory memory device;
at least one processor;
an image sensor capable of being controlled at different readout intervals in a plurality of different regions, and outputting, from the image sensor, a first image signal and a second image signal in parallel, wherein the first image signal is output from a first region in the plurality of different regions and the second image signal is output from a second region in the plurality of different regions, that is controlled at a readout interval shorter than those of the first region, and a first charge accumulation period of the first image signal overlaps with a second charge accumulation period of the second image signal;
a selection unit configured to select one of the first image signal and the second image signal;
a detection unit configured to detect a focus state level based on an image signal read out from the image sensor; and
a focus control unit configured to, based on the focus state level detected by the detection unit based on the image signal selected by the selection unit, control a focus lens in an imaging optical system for forming a light image from an object on the image sensor,
wherein the first image signal is used for at least one of display in a display unit and storage in a storage medium,
the selection unit selects the first image signal in the case where the object is darker than a predetermined first threshold and selects the second image signal in the case where the object is not darker than the first threshold; and
the selection unit, the detection unit, and the focus control unit are implemented by the at least one processor executing at least one program recorded on the at least one non-transitory memory device.

2. The image capturing apparatus according to claim 1, further comprising AE processing circuit,
wherein the first region is controlled at the first charge accumulation period determined based on a result of photometry performed by the AE processing circuit.

3. The image capturing apparatus according to claim 2, wherein the second region is controlled at the second charge accumulation period and a readout interval shorter than those of the first region.

4. The image capturing apparatus according to claim 1, wherein the focus state level is detected based on a contrast of the image signal selected by the selection unit.

5. The image capturing apparatus according to claim 1, wherein the first region is larger than the second region.

6. An image capturing apparatus comprising:
at least one non-transitory memory device;
at least one processor;
an image sensor capable of being controlled at different readout intervals in a plurality of different regions, and outputting, from the image sensor, a first image signal and a second image signal in parallel, wherein the first image signal is output from a first region in the plurality of different regions and the second image signal is output from a second region in the plurality of different regions, that is controlled at a readout interval shorter than those of the first region, and a first charge accumulation period of the first image signal overlaps with a second charge accumulation period of the second image signal;

a selection unit configured to select one of the first image signal and the second image signal;

a detection unit configured to detect a focus state level based on an image signal read out from the image sensor; and a focus control unit configured to, based on the focus state level detected by the detection unit based on the image signal selected by the selection unit, control a focus lens in an imaging optical system for forming a light image from an object on the image sensor, wherein the first image signal is used for at least one of display in a display unit and storage in a storage medium, the selection unit selects the first image signal in the case where the focus state level is higher than a predetermined threshold, and selects the second image signal in the case where the focus state level is less than or equal to the threshold, the selection unit, the detection unit, and the focus control unit are implemented by the at least one processor executing at least one program recorded on the at least one non-transitory memory device.

7. The image capturing apparatus according to claim 6, wherein the focus control unit sets a driving range of the focus lens used when the detection unit carries out the detection, and wherein the threshold is increased the broader the driving range is.

8. The image capturing apparatus according to claim 7, wherein the focus control unit switches the driving range of the focus lens.

9. The image capturing apparatus according to claim 7, wherein the threshold is increased the longer the focal length of the imaging optical system is.

10. The image capturing apparatus according to claim 6, further comprising a face detection circuit that detects a face area of the object, wherein the threshold is set to be higher in the case where a region of the face area detected by the face detection circuit is set as a region to be focused on than in the case where a predetermined region is set.

11. The image capturing apparatus according to claim 6, further comprising an operational member that designates a region to be focused on, wherein the threshold is set to be higher in the case where a region to be focused on has been designated by the operational member than in the case where a predetermined region is set.

12. An image capturing apparatus comprising:
at least one non-transitory memory device;
at least one processor;
an image sensor capable of being controlled at different readout intervals in a plurality of different regions, and outputting, from the image sensor, a first image signal and a second image signal in parallel, wherein the first image signal is output from a first region in the plurality of different regions and the second image signal is output from a second region in the plurality of different regions, that is controlled at a readout interval shorter than those of the first region, and a first charge accumulation period of the first image signal overlaps with a second charge accumulation period of the second image signal;

a selection unit configured to select one of the first image signal and the second image signal;

a detection unit configured to detect a focus state level based on an image signal read out from the image sensor; and a focus control unit configured to, based on the focus state level detected by the detection unit based on the image signal selected by the selection unit, control a focus lens in an imaging optical system for forming a light image from an object on the image sensor, wherein the first image signal is used for at least one of display in a display unit and storage in a storage medium, the selection unit selects the first image signal in the case where a result of the photometry indicates that the object is darker than a predetermined first threshold, selects the first image signal in the case where the object is not darker than the first threshold and the focus state level is higher than a predetermined second threshold, and selects the second image signal in the case where the focus state level is less than or equal to the second threshold, and the selection unit, the detection unit, and the focus control unit are implemented by the at least one processor executing at least one program recorded on the at least one non-transitory memory device.

13. A control method for an image capturing apparatus including an image sensor capable of being controlled at different readout intervals in a plurality of different regions, the method comprising:

a readout step of reading out a first image signal from the image sensor by controlling a first region in the plurality of different regions, and reading out a second image signal from the image sensor by controlling a second region in the plurality of different regions, at a readout interval shorter than those of the first region, wherein a first charge accumulation period of the first image signal overlaps with a second charge accumulation period of the second image signal, and the first image signal and the second image signal are read out in parallel;

a selection step of selecting the first image signal in the case where the object is darker than a predetermined threshold and selecting the second image signal in the case where the object is not darker than the threshold;

a detection step of detecting a focus state level based on an image signal read out from the image sensor; and a focus control step of, based on the focus state level detected in the detection step based on the image signal selected by the selection unit, controlling a focus lens in an imaging optical system for forming a light image from an object on the image sensor, wherein control is carried out so that the first image signal is used for at least one of display in a display unit and storage in a storage medium.

14. A non-transitory readable storage medium having stored thereon a program which is executable by an image processing apparatus, the program having a program code for realizing the control method for an image capturing apparatus, the control method comprising:

a readout step of reading out a first image signal from an image sensor by controlling a first region in the plurality of different regions, and reading out a second image signal from the image sensor by controlling a second region in the plurality of different regions, at a readout interval shorter than those of the first region, wherein a first charge accumulation period of the first image signal overlaps with a second charge accumulation period of the second image signal, and the first image signal and the second image signal are read out in parallel;

a selection step of selecting the first image signal in the case where the object is darker than a predetermined threshold and selecting the second image signal in the case where the object is not darker than the threshold;

a detection step of detecting a focus state level based on an image signal read out from the image sensor; and a focus control step of based on the focus state level detected in the detection step based on the image signal selected by the selection unit, controlling a focus lens in an imaging optical system for forming a light image from an object on the image sensor, wherein control is carried out so that the first image signal is used for at least one of display in a display unit and storage in a storage medium.

15. An image capturing apparatus comprising:
at least one non-transitory memory device;
at least one processor;
an image sensor capable of being controlled at different readout intervals in a plurality of different regions;
a determination unit configured to determine at least one of a stability level of the image capturing apparatus and a stability level of an object;
a selection unit configured to select one of a first image signal read out from a first region in the plurality of different regions and a second image signal read out from a second region, in the plurality of different regions, that is controlled at a readout interval shorter than those of the first region;
a detection unit configured to detect a focus state level based on an image signal read out from the image sensor; and
a focus control unit configured to, based on the focus state level detected by the detection unit based on the image signal selected by the selection unit, control a focus lens in an imaging optical system for forming a light image from an object on the image sensor,
wherein the selection unit selects the first image signal in the case where the object is darker than a predetermined first threshold, selects the second image signal in the case where the object is not darker than the first threshold and the stability level determined by the determination unit is not higher than a predetermined level, selects the first image signal in the case where the object is not darker than the first threshold, the stability level is higher than the predetermined level and the focus state level is higher than a predetermined second threshold, and selects the second image signal in the case where the object is not darker than the first threshold and the focus state level is less than or equal to the second threshold,
the first image signal is used for at least one of display in a display unit and stored in a storage medium, and
the determination unit, the selection unit, the detection unit, and the focus control unit are implemented by the at least one processor executing at least one program recorded on the at least one non-transitory memory device.

16. The image capturing apparatus according to claim 15, further comprising a face detection circuit that detects a face area of the object,
wherein the determination unit detects a change in the face area detected by the face detection circuit, and determines the stability level based on the detected change.

17. The image capturing apparatus according to claim 16, wherein the determination unit further determines the stability level based on a frequency at which the face detection circuit does and does not detect the face area.

18. The image capturing apparatus according to claim 15, wherein the selection unit compares the stability level to a plurality of predetermined levels, and in the case where the stability level is not higher, a region, among the plurality of different regions, in which the charge accumulation period and the readout interval are shorter, is taken as the second region.

19. The image capturing apparatus according to claim 15, wherein the first region is larger than the second region.

20. A control method for an image capturing apparatus including an image sensor capable of control at different readout intervals in a plurality of different regions, the method comprising:
a determination step of determining at least one of a stability level of the image capturing apparatus and a stability level of an object;
a readout step of reading out a first image signal by controlling a first region, in the plurality of different regions and reading out a second image signal by controlling a second region, in the plurality of different regions, at a readout interval shorter than those of the first region;
a selection step of selecting one of the first image signal and the second image signal;
a detection step of detecting a focus state level based on an image signal read out from the image sensor; and
a focus control step of, based on the focus state level detected in the detection step based on the image signal selected by the selection unit, controlling a focus lens in an imaging optical system for forming a light image from an object on the image sensor,
wherein the selection step selects the first image signal in the case where the object is darker than a predetermined first threshold, selects the second image signal in the case where the object is not darker than the first threshold and the stability level determined in the determination step is not higher than a predetermined level, selects the first image signal in the case where the object is not darker than the first threshold, the stability level is higher than the predetermined level and the focus state level is higher than a predetermined second threshold, and selects the second image signal in the case where the object is not darker than the first threshold and the focus state level is less than or equal to the second threshold; and
the first image signal is used for at least one of display in a display unit and stored in a storage medium.

21. A non-transitory readable storage medium having stored thereon a program which is executable by an image processing apparatus, the program having a program code for realizing the control method of an image capturing apparatus, the control method comprising:
a determination step of determining at least one of a stability level of the image capturing apparatus and a stability level of an object;

a readout step of reading out a first image signal by controlling a first region, in the plurality of different regions and reading out a second image signal by controlling a second region, in the plurality of different regions, at a readout interval shorter than those of the first region;

a selection step of selecting one of the first image signal and the second image signal;

a detection step of detecting a focus state level based on an image signal read out from the image sensor; and a focus control step of, based on the focus state level detected in the detection step based on the image signal selected by the selection unit, controlling a focus lens in an imaging optical system for forming a light image from an object on the image sensor, wherein the selection step selects the first image signal in the case where the object is darker than a predetermined first threshold, selects the second image signal in the case where the object is not darker than the first threshold and the stability level determined in the determination step is not higher than a predetermined level, selects the first image signal in the case where the object is not darker than the first threshold, the stability level is higher than the predetermined level and the focus state level is higher than a predetermined second threshold, and selects the second image signal in the case where the object is not darker than the first threshold and the focus state level is less than or equal to the second threshold; and the first image signal is used for at least one of display in a display unit and stored in a storage medium.

22. A control method for an image capturing apparatus including an image sensor capable of being controlled at different readout intervals in a plurality of different regions, the method comprising:

a readout step of reading out a first image signal from the image sensor by controlling a first region in the plurality of different regions, and reading out a second image signal from the image sensor by controlling a second region in the plurality of different regions, at a readout interval shorter than those of the first region, wherein a first charge accumulation period of the first image signal overlaps with a second charge accumulation period of the second image signal, and the first image signal and the second image signal are read out in parallel;

a selection step of selecting the first image signal in the case where the focus state level is higher than a predetermined threshold and selecting the second image signal in the case where the focus state level is less than or equal to the threshold;

a detection step of detecting a focus state level based on an image signal read out from the image sensor; and a focus control step of, based on the focus state level detected in the detection step based on the image signal selected by the selection unit, controlling a focus lens in an imaging optical system for forming a light image from an object on the image sensor, wherein control is carried out so that the first image signal is used for at least one of display in a display unit and storage in a storage medium.

23. A non-transitory readable storage medium having stored thereon a program which is executable by an image processing apparatus, the program having a program code for realizing the control method for an image capturing apparatus, the control method comprising:

a readout step of reading out a first image signal from an image sensor by controlling a first region in the plurality of different regions, and reading out a second image signal from the image sensor by controlling a second region in the plurality of different regions, at a readout interval shorter than those of the first region, wherein a first charge accumulation period of the first image signal overlaps with a second charge accumulation period of the second image signal, and the first image signal and the second image signal are read out in parallel;

a selection step of selecting the first image signal in the case where the focus state level is higher than a predetermined threshold and selecting the second image signal in the case where the focus state level is less than or equal to the threshold;

a detection step of detecting a focus state level based on an image signal read out from the image sensor; and a focus control step of, based on the focus state level detected in the detection step based on the image signal selected by the selection unit, controlling a focus lens in an imaging optical system for forming a light image from an object on the image sensor, wherein control is carried out so that the first image signal is used for at least one of display in a display unit and storage in a storage medium.

* * * * *